(12) United States Patent
Hofmeister et al.

(10) Patent No.: US 7,676,767 B2
(45) Date of Patent: Mar. 9, 2010

(54) PEEL BACK USER INTERFACE TO SHOW HIDDEN FUNCTIONS

(75) Inventors: Nicholas M. Hofmeister, Mt. Pleasant, MI (US); Dane T. Storrusten, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 776 days.

(21) Appl. No.: 11/154,402

(22) Filed: Jun. 15, 2005

(65) Prior Publication Data

US 2006/0284852 A1    Dec. 21, 2006

(51) Int. Cl.
  *G06F 3/01*   (2006.01)
  *G06F 3/033*  (2006.01)
  *G06F 3/048*  (2006.01)
  *G06F 3/041*  (2006.01)

(52) U.S. Cl. .................. 715/863; 715/702; 715/790; 715/797; 345/173

(58) Field of Classification Search .................. 715/797, 715/796, 795, 794, 782, 702, 776, 778, 766, 715/790, 863; 345/173
See application file for complete search history.

(56) References Cited

U.S. PATENT DOCUMENTS 5,007,085 A * 4/1991 Greanias et al. ............... 726/34
5,333,255 A * 7/1994 Damouth .................... 715/776
5,463,725 A * 10/1995 Henckel et al. ............. 715/776
5,659,694 A * 8/1997 Bibayan .................... 715/788
6,115,724 A * 9/2000 Booker ...................... 715/273
6,628,310 B1 * 9/2003 Hiura et al. ................. 715/776
7,249,327 B2 * 7/2007 Nelson et al. ............... 715/782
7,480,873 B2 * 1/2009 Kawahara ................... 715/848
2003/0063115 A1 * 4/2003 Kaku et al. ................. 345/711

* cited by examiner

*Primary Examiner*—Kieu Vu
*Assistant Examiner*—Blaine T. Basom
(74) *Attorney, Agent, or Firm*—Workman Nydegger

(57) ABSTRACT

A user is able to access additional functions not represented in a current image displayed by a graphical user interface. At least one function not presented on the current image is represented by a symbol on an underlying image that is at least partially covered by the current image. When the user performs a predetermined user input (e.g., selecting a corner of the current image), the underlying image and the at least one function represented thereby become accessible. When the user input is performed, a visual effect depicts the current image being at least partially removed from over the underlying image, thereby revealing and permitting access to the at least one additional function. The user input is made by the user performing an action with the user's hand or another object adjacent to a responsive display, or by using a pointing device to manipulate a displayed image.

21 Claims, 24 Drawing Sheets

FIG. 17A

SPREADSHEET #1.XLS — 1704, 1708, 1706, 1700a

`+B2-B3`

|  | B | C | D | E | F |  |  |
|---|---|---|---|---|---|---|---|
|  | 2002 | 2003 |  | Totals |  | Avgs. |  |
| Income | 10,122 | 11,261 |  |  |  |  |  |
|  | 8,442 | 8,751 |  |  |  |  |  |
|  | 1,680 | 2,510 |  |  |  |  |  |
|  |  |  |  |  |  |  |  |
|  |  |  |  |  |  |  |  |
| Income | 12,398 | 13,215 |  |  |  |  |  |
|  | 9,657 | 10,120 |  |  |  |  |  |
|  | 2,741 | 3,095 |  |  |  |  |  |
|  |  |  |  |  |  |  |  |
|  |  |  |  |  |  |  |  |
| Income | 119,988 | 126,504 |  |  |  |  |  |
|  | 101,340 | 103,824 |  |  |  |  |  |
|  | 18,648 | 22,680 |  |  |  |  |  |

FIG. 17B 1712, 1714, 1710, 1708, 1706, 1700b

File  Edit  View  Insert  Format  Tools  Data  Window  Help

SPREADSHEET #1.XLS

`+B2-B3`

| Income | 10,122 | 11,261 |  |  |  |  |  |
|---|---|---|---|---|---|---|---|
|  | 8,442 | 8,751 |  |  |  |  |  |
|  | 1,680 | 2,510 |  |  |  |  |  |
|  |  |  |  |  |  |  |  |
|  |  |  |  |  |  |  |  |
| Income | 12,398 | 13,215 |  |  |  |  |  |
|  | 9,657 | 10,120 |  |  |  |  |  |
|  | 2,741 | 3,095 |  |  |  |  |  |
|  |  |  |  |  |  |  |  |
|  |  |  |  |  |  |  |  |
| Income | 119,988 | 126,504 |  |  |  |  |  |
|  | 101,340 | 103,824 |  |  |  |  |  |
|  | 18,648 | 22,680 |  |  |  |  |  |

PEEL BACK USER INTERFACE TO SHOW HIDDEN FUNCTIONS

BACKGROUND

Because of the widespread popularity of computers, most people have become comfortable with conventional computer user input devices such as keyboards and pointing devices. The keystrokes on a keyboard, and the cursor movement and control provided by mice, trackballs, and joysticks and other pointing devices are sufficiently intuitive to provide satisfactory interfaces for most computer-related tasks.

However, as computers become more commonplace throughout our environment, the desire to make computers and their interfaces even more user-friendly continues to promote development in this area. For example, the MIT Media Lab, as reported by Brygg Ullmer and Hiroshi Ishii in "The metaDESK: Models and Prototypes for Tangible User Interfaces," Proceedings of UIST 10/1997:14 17," has developed another form of "keyboardless" human machine interface. The metaDESK includes a generally planar graphical surface that not only displays computing system text and graphic output, but also receives user input by responding to an object placed against the graphical surface. The combined object responsive and display capability of the graphical surface of the metaDESK is facilitated using infrared (IR) lamps, an IR camera, a video camera, a video projector, and mirrors disposed beneath the surface of the metaDESK. The mirrors reflect the graphical image projected by the projector onto the underside of the graphical display surface to provide images that are visible to a user from above the graphical display surface. The IR camera can detect IR reflections from the undersurface of an object placed on the graphical surface, to detect the object and its disposition.

Others have been developing similar keyboardless interfaces. For example, papers published by Jun Rekimoto of the Sony Computer Science Laboratory, Inc. and associates describe a "HoloWall" and a "HoloTable" that display images on a surface and use IR light to detect objects positioned adjacent to the surface.

By detecting a specially configured object or by detecting IR reflected light from an object disposed on a graphical display surface, the metaDESK can respond to the contemporaneous placement and movement of the object on the display surface to carry out a predefined function, such as displaying and moving a map of the MIT campus. Thus, computing systems such as the HoloWall and metaDESK may provide a more natural degree of human-machine interaction by providing the means for a computer to respond to specific objects in a defined manner. By facilitating a more natural input arising from the person's interaction with a graphical display, such technologies broaden and extend the manner in which a user might provide input to a computing system. This extended ability, however, does present some concerns, which are not necessarily unique to this form of user interaction with applications and an operating system. Indeed, graphical user interfaces often become crowded with icons used to invoke commands, functions, and applications. Thus, as a graphic user interface display screen becomes increasingly visually busy, it also becomes increasingly easy for a user to unintentionally invoke an unintended function. This problem can occur in regard to all types of user interactive displays.

FIG. 1A shows a computer display screen 100a displaying a conventional spreadsheet application window 110 and a conventional web browser application window 120. On application windows 110 and 120, there are numerous icons 102 that enable a user to initiate functions with a pointing device (not shown). The user can simply direct a cursor 104 to a selected icon and engage the function it represents by depressing a control button on the pointing device one or more times. Application windows 110 and 120 both include a familiar trio of icons in their upper right hand corners. These icons include minimize icons 112 and 122, maximize icons 114 and 124, and exit icons 116 and 126. Because of the close proximity of these icons to each other, even skilled users may, on occasion, inadvertently select and activate an undesired icon.

As shown in a screen 100b of FIG. 1B, for example, the user has selected exit icon 116 in spreadsheet application window 110. If the user's selection was unintentional, all of the data entered in application window 110 might be lost, which the spreadsheet application window closes. To safeguard against such loss of data, once any new data have been entered into application window 10, selection of exit icon 116 conventionally often causes a confirmation dialog box 130 to be presented to the user. Confirmation window 130 includes buttons enabling a user to confirm or retract a selection of exit icon 116 by selecting "yes" button 132 to exit after saving changes, "no" button 134 to exit without saving changes, or "cancel" button 136 to return to application window 110 without saving changes or exiting the application. A user accidentally selecting exit icon 116 most likely would choose cancel button 136 to rescind the unintended action and thereby avoid the undesired loss of data changed (i.e., entered, edited, or deleted) since the spreadsheet was last saved.

However, not all applications provide such safeguards. For example, a web browser, such as that shown by way of example in application window 120, might enable a user to exit the web browser application by selecting exit icon 126 without requesting confirmation from the user. Accordingly, as shown in a screen 100c of FIG. 1C, if a user moves cursor 104 to exit icon 126 in application window 120 and select the exit icon, application window 120 will be closed without requiring that user confirm the apparent decision to exit the browser application. Thus, if a user should inadvertently select exit icon 126 of browser application window 120 in screen 100c, the user might unexpectedly be presented with a blank screen. If the user was in the middle of writing a lengthy e-mail using a web-based e-mail service or had found a desired web page after an exhaustive search, with one errant mouse click, the user's work is lost. These types of problems can arise in almost any type of graphic user interface environment in which a user may make an unintended selection and thereby invoke a function that produces an undesired result.

While requiring confirmation of each function selected by a user as is conventionally done might solve the problem of inadvertent selection of a function by the user, it is simply not efficient to require that the user confirm the selection of all functions. Usually, only functions that can produce serious consequences are selected for confirmation, but even then, the user may tire of being required to confirm such a selection each time it is actually intended. Also, some functions, which may have less serious consequences, will simply add to the confusion and clutter of a graphic user interface display, if always visible to a user. Thus, it would be desirable to develop a different approach for dealing with these issues.

SUMMARY

As discussed in greater detail below, in regard to various embodiments, the present development facilitates an intuitive, user-friendly method for initiating a function on a computing device and helps to avoid the unintended execution of the function, while also reducing the visual clutter of a display that can occur when all functions that are available for selection by the user are always visually presented on the display.

One aspect of this development is thus directed to a method for receiving input in a computing device having a graphical user interface presented on a display. The method includes the step of identifying at least one additional function of the computing device that is on at least a portion of an underlying image. Initially, the function is not visually apparent to a user and cannot be accessed because it is at least partially obscured by a current image that is presented to the user. The current image represents or is associated with a current function. A predetermined user input can be applied to access the underlying image. Upon receiving the predetermined user input, the method provides for initiating a visual effect depicting the current image being at least partially removed from over the underlying image, to visually expose and enable access by the user to the at least one additional function, which was previously visually hidden by the current image. Because the additional function, which when executed, for example, might cause the application currently running on the computing device to exit, is normally obscured or at least partially hidden, the user is not likely to inadvertently select this additional function.

Another aspect of this development is directed to a memory medium on which are stored machine instructions for carrying out the steps that are generally consistent with the method. A still further aspect is directed to a system that enables functions generally consistent with the steps of the method to be implemented.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 18:
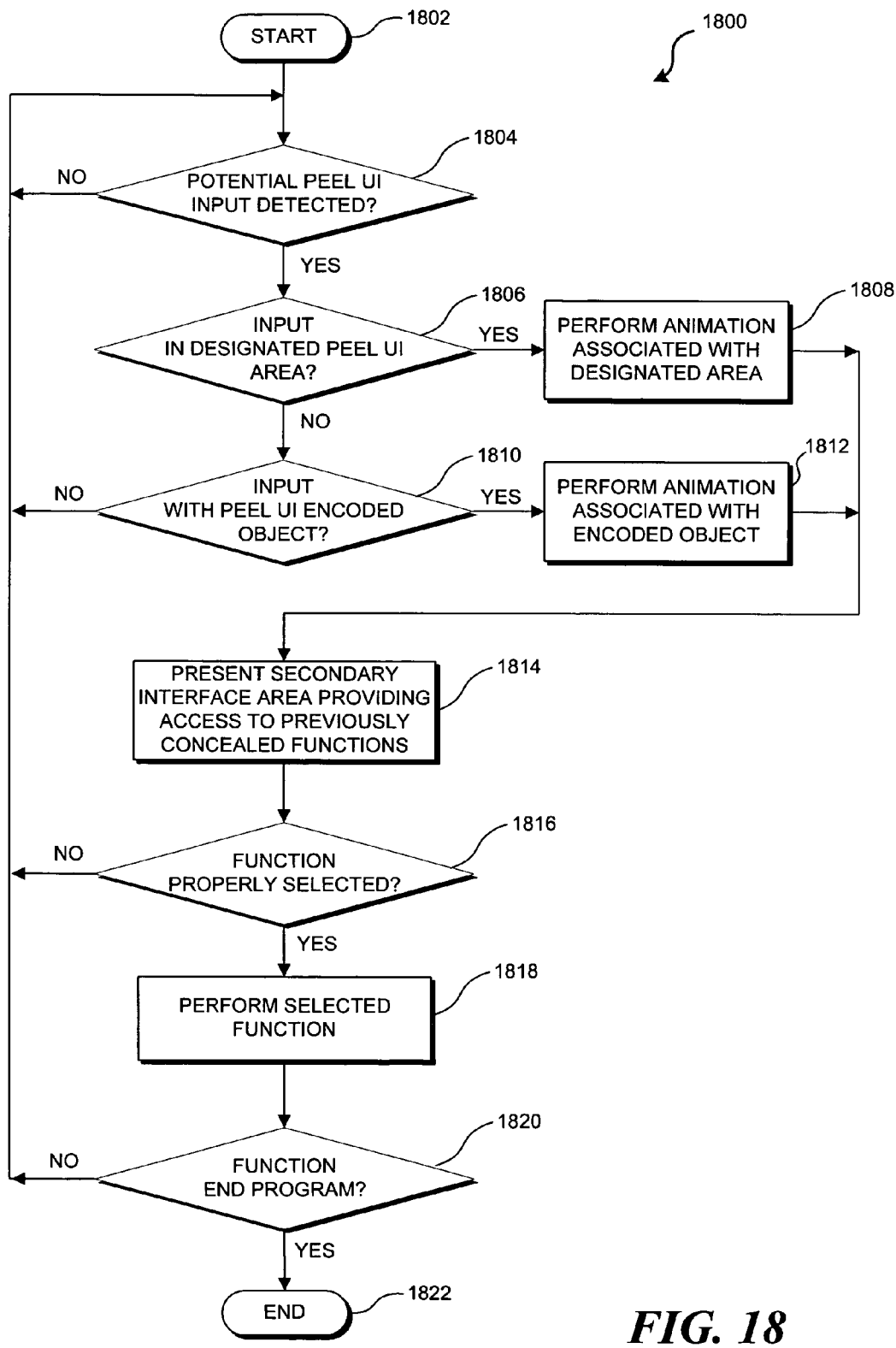

FIGS. 6A-6D, 7A-7B, and 8A-8B illustrate a user engaging a peel-back interface presented by an interactive display surface and a function secured and/or concealed by the peel-back interface;

FIGS. 9A-9C, 10A-10B, 11A-11B, 12A-12B, 13A-13B, 14A-14B, and 15A-15B, and 16A-16B illustrate a user engaging alternative embodiments of the present invention presented by an interactive display surface;

FIGS. 17A-17B present an embodiment of the present invention adapted for use with a pointing device-driven graphical user interface; and FIG. 18 is a flow diagram illustrating the logical steps for responding to user inputs through an interface according to an embodiment of the present invention.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive.

Unintended Selection of an Exit Function on an Interactive Display Screen

In the Background section above, a problem arising in conventional graphic user interface display screens was discussed. However, a similar problem might result when using an interactive display surface that enables a user to employ physical external objects to interact with the display surface. As shown in an example in FIG. 2A, an interactive display 200a is presenting an exemplary graphic user interface screen for a music player application that enables a user to use physical objects, such as a finger 202, to build a play list 204 by selecting from album cover or similar icons 206 by bringing the finger in close proximity to the desired icon.

Unfortunately, a user moving finger 202 over display surface 200a might inadvertently select an exit icon 208. Exit icon 208 is relatively close to icons 206 and can be easily chosen when not intended. As shown in an interactive display 200b of FIG. 2B, by inadvertently dragging finger 202 from a first position 202a toward an edge of the interactive display surface after, for example, filling playlist 204 with a number of songs, finger 202 may contact exit icon 208. Unfortunately, in so doing, after the user has spent time carefully selecting a number of songs for the playlist, the user might close the music player before saving the playlist, thus losing the songs that were selected and leaving a blank display.

Exemplary Computing System for Implementing Current Embodiments

Figure 3:
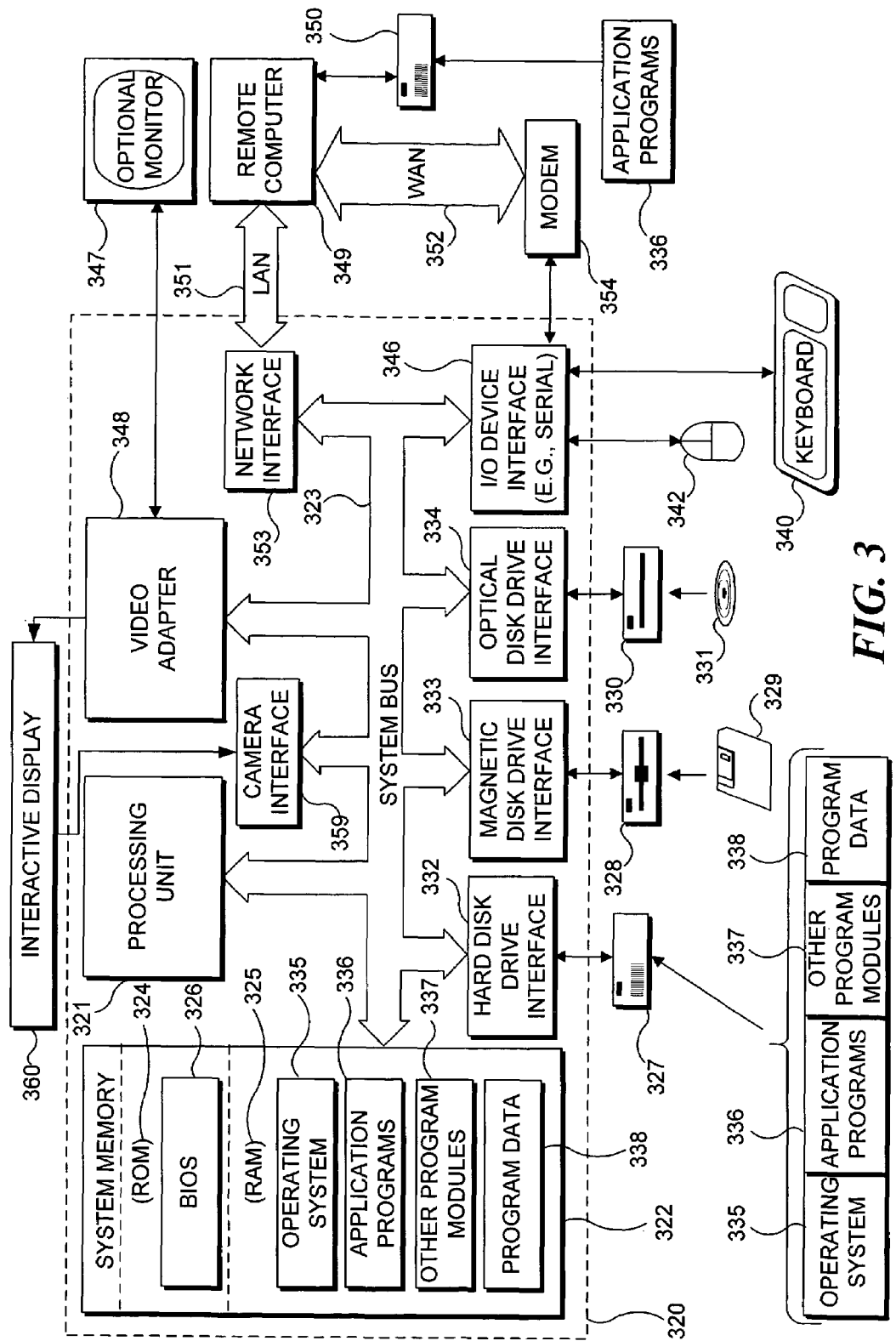
FIG. 3 is a functional block diagram of a generally conventional computing device or personal computer (PC) that is suitable for implementing an interactive display surface as used in a preferred embodiment for practicing the present invention.

With reference to FIG. 3, an exemplary system suitable for making use of embodiments of the current development is shown. It will be appreciated, however, that this development is not limited to being practiced on the system of FIG. 3, but instead, can be carried out in connection with other computing devices. The system of FIG. 3 includes a general purpose computing device in the form of a conventional personal computer (PC) 320, provided with a processing unit 321, a system memory 322, and a system bus 323. The system bus couples various system components including the system memory to processing unit 321 and may be any of several types of bus structures, including a memory bus or memory controller, a peripheral bus, and a local bus using any of a variety of bus architectures. The system memory includes read only memory (ROM) 324 and random access memory (RAM) 325. A basic input/output system 326 (BIOS), containing the basic routines that help to transfer information between elements within the PC 320, such as during start up, is stored in ROM 324. PC 320 further includes a hard disk drive 327 for reading from and writing to a hard disk (not shown), a magnetic disk drive 328 for reading from or writing to a removable magnetic disk 329, and an optical disk drive 330 for reading from or writing to a removable optical disk 331, such as a compact disk-read only memory (CD-ROM) or other optical media. Hard disk drive 327, magnetic disk drive 328, and optical disk drive 330 are connected to system bus 323 by a hard disk drive interface 332, a magnetic disk drive interface 333, and an optical disk drive interface 334, respectively. The drives and their associated computer readable media provide nonvolatile storage of computer readable machine instructions, data structures, program modules, and other data for PC 320. Although the exemplary environment described herein employs a hard disk, removable magnetic disk 329, and removable optical disk 331, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, removable magnetic disk 329, removable optical disk 331, ROM 324, or RAM 325, including an operating system 335, one or more application programs 336, other program modules 337, and program data 338. A user may enter commands and information in PC 320 and provide control input through input devices, such as a keyboard 340 and a pointing device 342. Pointing device 342 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. Also, PC 320 may include a Bluetooth radio or other wireless interface for communication with various types of interface device, such as printers, or an embodiment of the interactive display table, as discussed below. These and other input/output (I/O) devices are often connected to processing unit 321 through an I/O device interface 346 that is coupled to the system bus 323. The term I/O interface is intended to encompass each interface specifically used for a serial port, a parallel port, a game port, a keyboard port, and/or a universal serial bus (USB). System bus 323 is also connected to a camera interface 359, which is coupled to an interactive display 360 to receive signals form a digital video camera that is included therein, as discussed below. The digital video camera may be instead coupled to an appropriate serial I/O port, such as to a USB version 32.0 port. An optional monitor 347 can be connected to system bus 323 via an appropriate interface, such as a video adapter 348; however, the interactive display table can provide a much richer display and enable the user to interact with the system in a more intuitive manner for input of information and control of software applications and can therefore be coupled to the video adaptor in lieu of or in addition to a conventional monitor. It will be appreciated that PCs are often coupled to other peripheral output devices (not shown), such as speakers (through a sound card or other audio interface—not shown) and printers.

Embodiments of the present development may be practiced on a single machine, or on multiple computing devices. For example, PC 320 can also operate in a networked environment using logical connections to one or more remote computers, such as a remote computer 349. Remote computer 349 may be another PC, a server (which is typically generally configured much like PC 320), a router, a network PC, a peer device, or a satellite or other common network node, and typically includes many or all of the elements described above in connection with PC 320, although only an external memory storage device 350 has been illustrated in FIG. 3. The logical connections depicted in FIG. 3 include a local area network (LAN) 351 and a wide area network (WAN) 352. Such networking environments are common in offices, enterprise wide computer networks, intranets, and the Internet.

When used in a LAN networking environment, PC 320 is connected to LAN 351 through a network interface or adapter 353. When used in a WAN networking environment, PC 320 typically includes a modem 354, or other means such as a cable modem, Digital Subscriber Line (DSL) interface, or an Integrated Service Digital Network (ISDN) interface for establishing communications over WAN 352, such as the Internet. Modem 354, which may be internal or external, is connected to the system bus 323 or coupled to the bus via I/O device interface 346, i.e., through a serial port. In a networked environment, program modules, or portions thereof, used by PC 320 may be stored in the remote memory storage device. It will be appreciated that the network connections shown are exemplary and other means of establishing a communications link between the computers may be used, such as wireless communication and wide band network links.

Exemplary Interactive Display Table with Interactive Display Surface

Figure 4A:
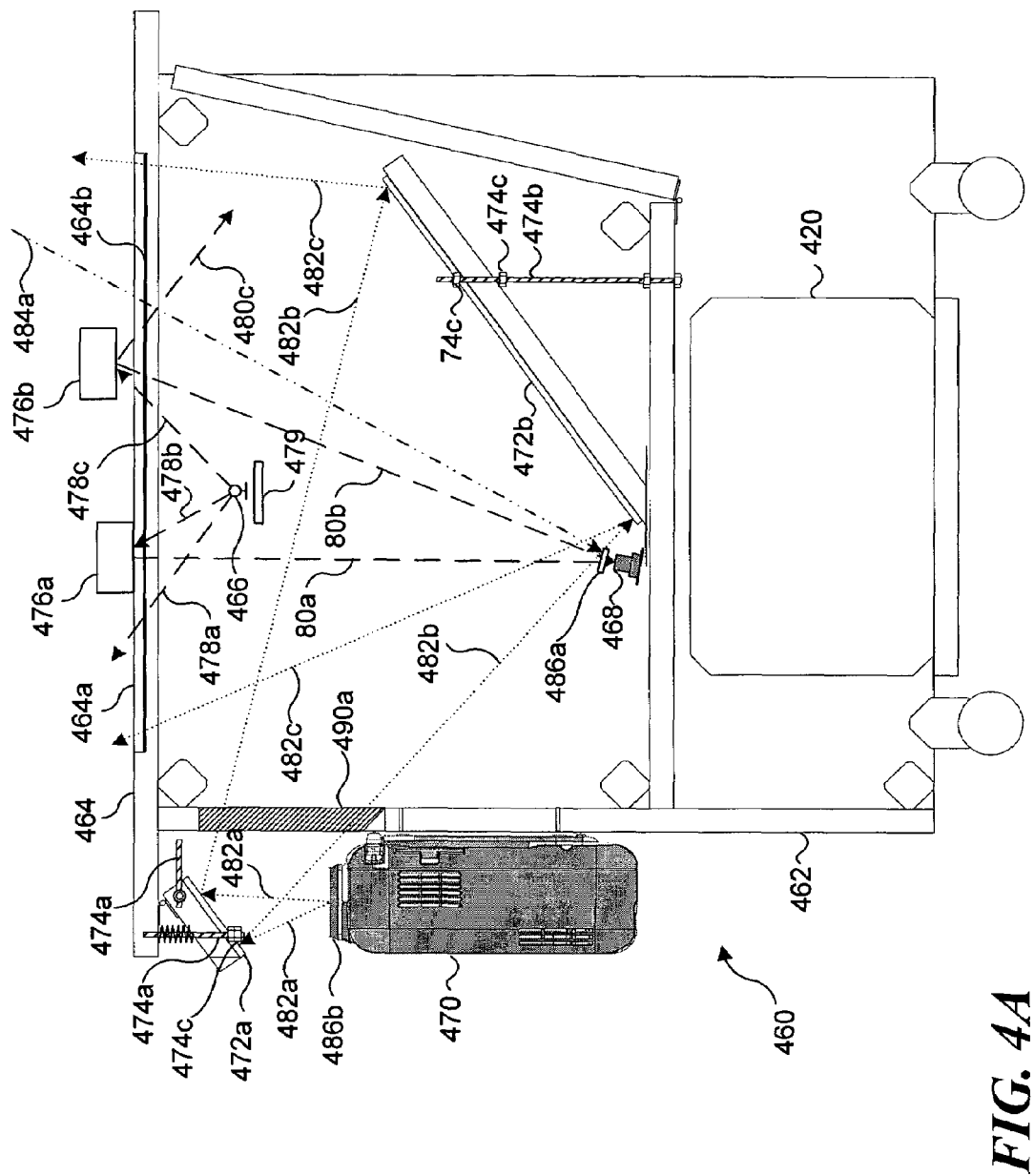
FIG. 4A is a cross-sectional view of a table having an interactive display surface, illustrating internal components of the table.

In FIG. 4A, an exemplary interactive display table 460 is shown that includes PC 420 within a frame 462 and which serves as both an optical input and video display device for the PC. This exemplary embodiment is not intended to in any way be viewed as limiting on the claims that follow, since it is only one example of a display surface useful in connection with practicing the present development. In this cut-away figure of interactive display table 460, rays of light used for displaying text and graphic images are generally illustrated using dotted lines 482a-82c, while rays of IR light used for sensing objects on or just above a display surface 464a of interactive display table 460 are illustrated using dashed lines 480a-80b. Display surface 464a is set within an upper surface 464 of interactive display table 460. The perimeter of the table surface is useful for supporting a user's arms or other objects, including objects that may be used to interact with the graphic images or virtual environment being displayed on display surface 464a.

IR light sources 466 preferably comprise a plurality of IR light emitting diodes (LEDs) and are mounted on the interior side of frame 462 in this exemplary embodiment, but can alternatively be mounted at other locations on the interactive display table. The IR light that is produced by IR light sources 466 is directed upwardly toward the underside of display surface 464a, as indicated by dashed lines 478a, 478b, and 478c. The IR light from IR light sources 466 is reflected from any objects that are atop or proximate to the display surface after passing through a translucent layer 464b of the table, comprising a sheet of vellum or other suitable translucent material with light diffusing properties. As used herein and in the claims that follow in connection with objects positioned on or proximate to the interactive display surface, the term "adjacent to" is used with the intention that this term encompass both an object that is actually touching the interactive display surface as well as one that is just above but not necessarily touching the interactive display surface. Although only one IR light source 466 is shown, it will be appreciated that a plurality of such IR light sources may be mounted at spaced-apart locations around the interior sides of frame 462 to provide an even illumination of display surface 464a. The IR light produced by the IR light sources may:

exit through the table surface without illuminating any objects, as indicated by dash line 478a;

illuminate objects on the table surface, as indicated by dash line 478b; or illuminate objects disposed a short distance above the table surface but not touching the table surface, as indicated by dash line 478c.

By way of example, objects above display surface 464a can include a "touch" object 476a that rests atop the display surface and/or a "hover" object 476b that is close to but not in actual contact with the display surface. Thus, both touch and hover objects are "adjacent to" the display surface, as that term is used herein. As a result of using translucent layer 464b under the display surface to diffuse the IR light passing through the display surface, as an object approaches the top of display surface 464a, the amount of IR light that is reflected by the object increases to a maximum level that is achieved when the object is actually in contact with the display surface.

A digital video camera 468 is mounted to frame 462 below display surface 464a in a position appropriate to receive IR light that is reflected from any touch object or hover object disposed above display surface 464a. Digital video camera 468 is equipped with an IR pass filter 486a that transmits only IR light and blocks ambient visible light traveling through display surface 464a along dash-dot line 484a. A baffle 479 is disposed between IR light source 466 and the digital video camera to prevent IR light that is directly emitted from IR light source 466 from entering the digital video camera, since it is preferable that this digital video camera should produce an output signal that is only responsive to the IR light reflected from objects that are a short distance above or in contact with display surface 464a and corresponds to an image of IR light reflected from objects on or above the display surface. It will be apparent that digital video camera 468 will also respond to any IR light included in the ambient light that passes through display surface 464a from above and into the interior of the interactive display including ambient IR light that also travels along the path indicated by dash-dot line 484a.

IR light reflected from objects on or above the table surface may be:

reflected back through translucent layer 464b, through IR pass filter 486a and into the lens of digital video camera 468, as indicated by dashed lines 480a and 480b; or reflected or absorbed by other interior surfaces within the interactive display without entering the lens of digital video camera 468, as indicated by dashed line 480c.

Translucent layer 464b diffuses both incident and reflected IR light. Thus, as explained above, "hover" objects such as hover object 476b that are closer to display surface 464a will reflect more IR light back to digital video camera 468 than objects of the same reflectivity that are farther away from the display surface. The digital video camera 468 senses the IR light reflected from "touch" and "hover" objects within its imaging field and produces a digital signal corresponding to images of the reflected IR light that is input to the PC 420 for processing to determine a location of each such object, and optionally, the size, orientation, and shape of the object. It should be noted that a portion of an object, such as a user's forearm, may be above the table while another portion, such as the user's finger, is in contact with the display surface. In addition, an object may include an IR light reflective pattern or coded identifier, such as a bar code, on its bottom surface that is specific to that object or to a class of related objects of which that object is a member. Accordingly, the imaging signal from the digital video camera 468 can also be used for detecting each such specific object, as well as determining its orientation, based on the IR light reflected from its reflective pattern, in accord with the present invention.

Embodiments of the present invention are thus operable in connection with selection and control of an application by recognizing an object and/or its position relative to the interactive display surface 464a by detecting its identifying characteristics using the IR light reflected from the object. For example, the undersurface of an object may include an encoded marking that enable each different object to be readily recognized when the object is positioned adjacent to the display surface so that IR light reflected/absorbed by the encoded markings is detected by digital video camera 468. Shape, size, and combinations of these and other physical parameters can also be sensed in regard to the IR light reflected/absorbed by an object to enable the object and its position (and/or orientation) to be recognized by the digital video camera.

Figure 4B:
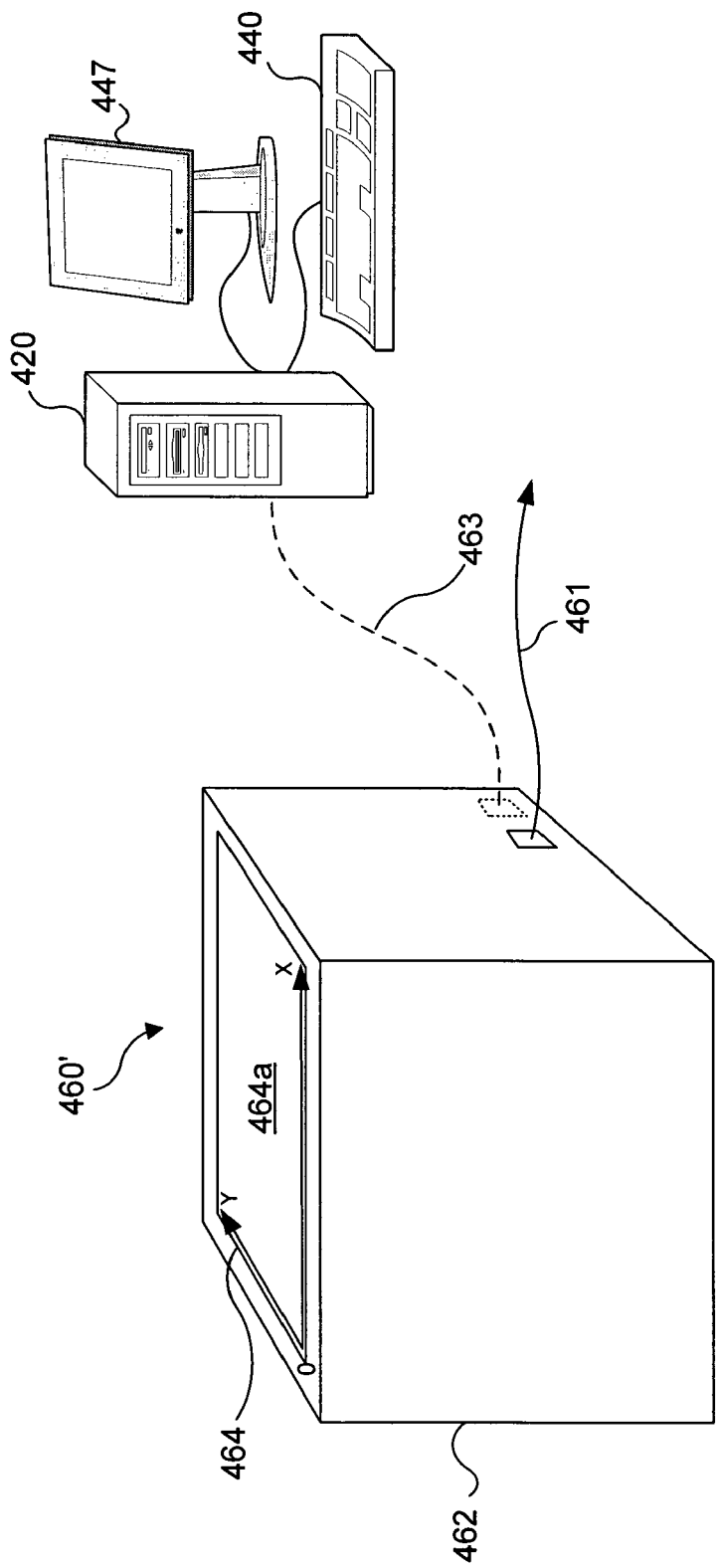
FIG. 4B is an isometric view of a table having an interactive display surface coupled with an external computing system.

PC 420 may be integral to interactive display table 460 as shown in FIG. 4A, or alternatively, may instead be external to the interactive display table, as shown in the embodiment of FIG. 4B. In FIG. 4B, an interactive display table 460' is connected through a data cable 463 to an external PC 420 (which includes optional monitor 447, as mentioned above). Alternatively, external PC 420 can be connected to interactive display table 460' via a wireless link (i.e., WiFi or other appropriate radio signal link). As also shown in this Figure, a set of orthogonal X and Y axes are associated with display surface 464a, as well as an origin indicated by "0". While not discretely shown, it will be appreciated that a plurality of coordinate locations along each orthogonal axis can be employed to specify any location on display surface 464a.

If an interactive display table 460' is connected to an external PC 420 (as in FIG. 4B) or to some other type of external computing device, such as a set top box, video game, laptop computer, or media computer (not shown), then interactive display table 460' comprises an input/output device. Power for interactive display table 460' is provided through a power lead 461, which is coupled to a conventional alternating current (AC) source (not shown). Data cable 463, which connects to interactive display table 460', can be coupled to a USB 2.0 port, an Institute of Electrical and Electronics Engineers (IEEE) 1394 (or Firewire) port, or an Ethernet port on PC 420. It is also contemplated that as the speed of wireless connections continues to improve, interactive display table 460' might also be connected to a computing device, such as PC 420 via such a high-speed wireless connection, or via some other appropriate wired or wireless data communication link. Whether included internally as an integral part of the interactive display, or externally, PC 420 executes algorithms for processing the digital images from digital video camera 468 and executes software applications that are designed to employ the more intuitive user interface functionality of the interactive display table to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing an other tasks that then need not be done by the external PC.

An important and powerful feature of interactive display table 460 or 460' (i.e., of either of the embodiments of the interactive display table discussed above) is its ability to display graphic images or a virtual environment for games or other software applications and to enable an interaction between the graphic image or virtual environment visible on display surface 464*a* and identify objects that are resting atop the display surface, such as object 476*a*, or are hovering just above it, such as object 476*b*.

Again referring to FIG. 4A, interactive display table 460 includes a video projector 470 that is used to display graphic images, a virtual environment, or text information on display surface 464*a* The video projector is preferably of a liquid crystal display (LCD) or digital light processor (DLP) type, or a liquid crystal on silicon (LCoS) display type, with a resolution of at least 640×480 pixels. An IR cut filter 486*b* is mounted in front of the projector lens of video projector 470 to prevent IR light emitted by the video projector from entering the interior of the interactive display table where the IR light might interfere with the IR light reflected from object(s) on or above display surface 464*a* Video projector 470 projects light along dotted line 482*a* toward a first mirror assembly 472*a* First mirror assembly 472*a* reflects projected light from dotted, line 482*a* received from video projector 470 along dotted line 482*b* through a transparent opening 490*a* in frame 462, so that the reflected projected light is incident on a second mirror assembly 472*b*. Second mirror assembly 472*b* reflects light from dotted line 482*b* along dotted line 482*c* onto translucent layer 464*b*, which is at the focal point of the projector lens, so that the projected image is visible and in focus on display surface 464*a* for viewing.

Alignment devices 474*a* and 474*b* are provided and include threaded rods and rotatable adjustment nuts 474*c* for adjusting the angles of the first and second mirror assemblies to ensure that the image projected onto the display surface is aligned with the display surface. In addition to directing the projected image in a desired direction, the use of these two mirror assemblies provides a longer path between projector 470 and translucent layer 464*b* to enable a longer focal length (and lower cost) projector lens to be used with the projector.

The foregoing and following discussions describe an interactive display device, of which interactive display table 460 and 460' are simply exemplary. However, other display surfaces can be employed instead. For example, it should be understood that the interactive display surface need not be in the form of a generally horizontal table top. The principles described in the following description are also applicable to display surfaces of different shapes and curvatures and that are mounted in orientations other than horizontal and which employ other techniques for sensing an object relative to a displayed image. Although the following description at times refers to placing physical objects "on" the interactive display surface, physical objects may be placed adjacent to the interactive display surface by placing the physical objects in contact with the display surface, or otherwise adjacent to the display surface.

Exemplary Application Employing One Embodiment

Figure 2A:
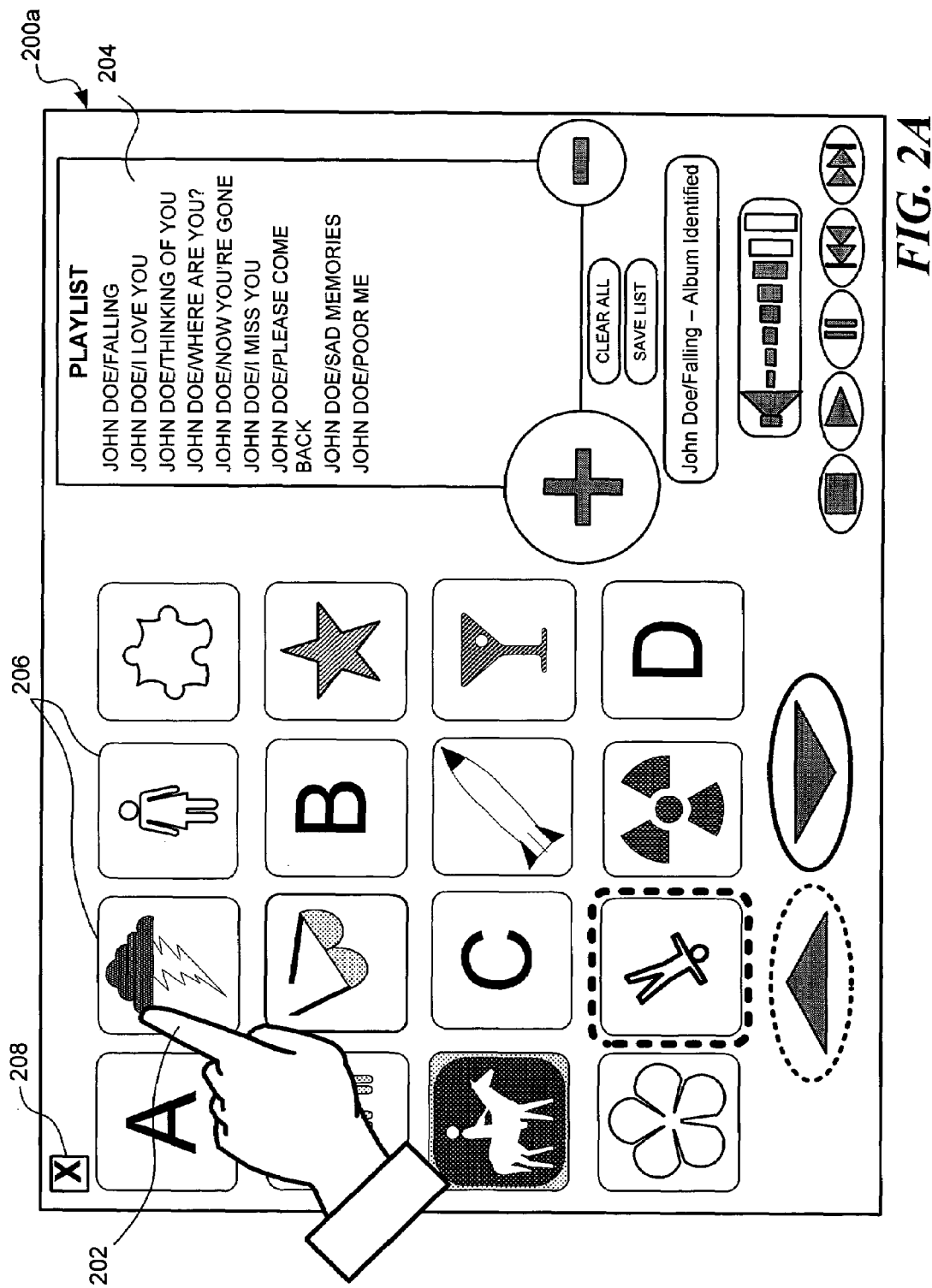
FIGS. 2A-2B are interactive display surface screens that show how a user might also inadvertently exit an application by inadvertently making a selection on the display screen with an external physical object such as a finger.
Figure 2B:
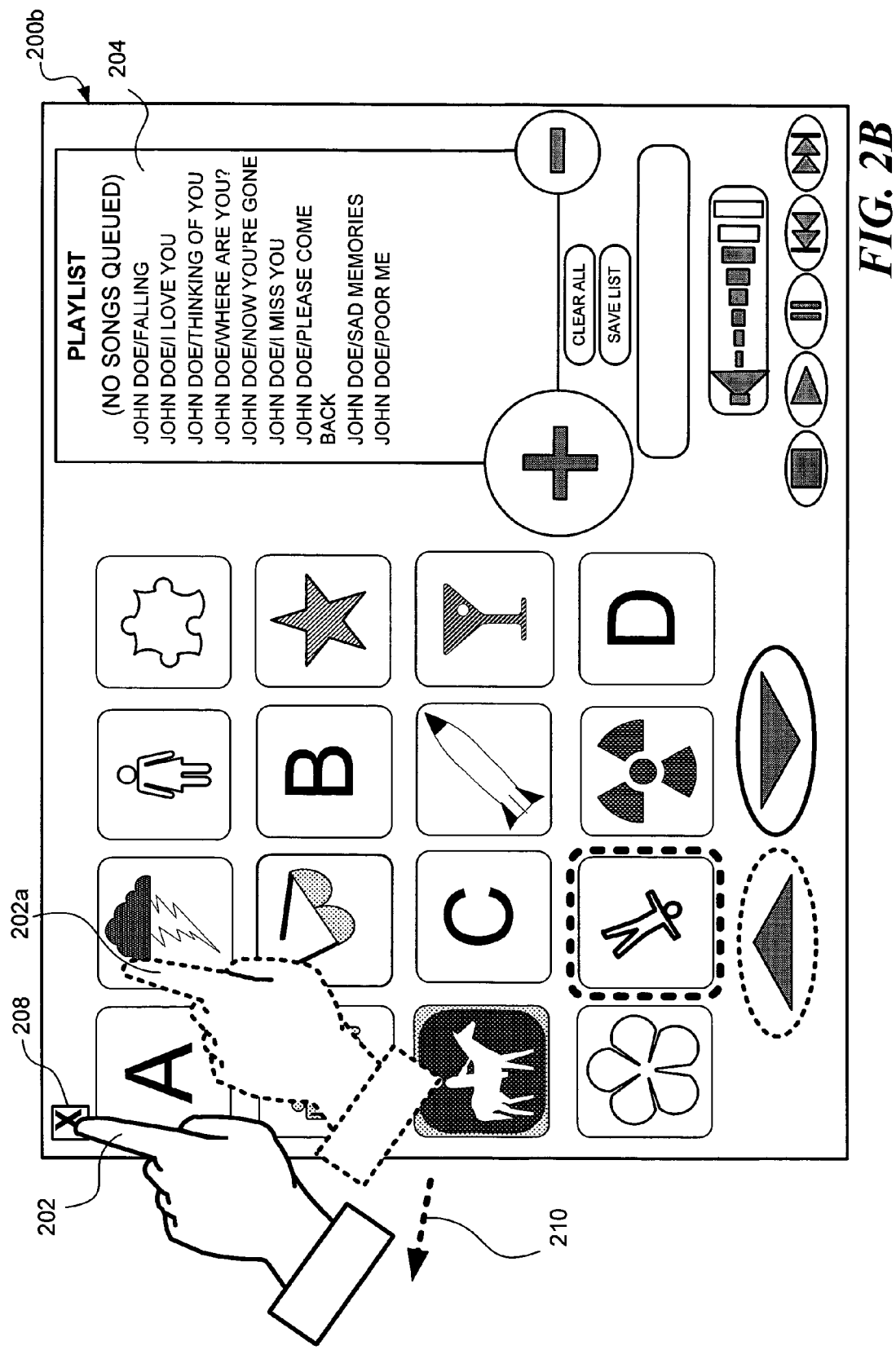
Figure 5:
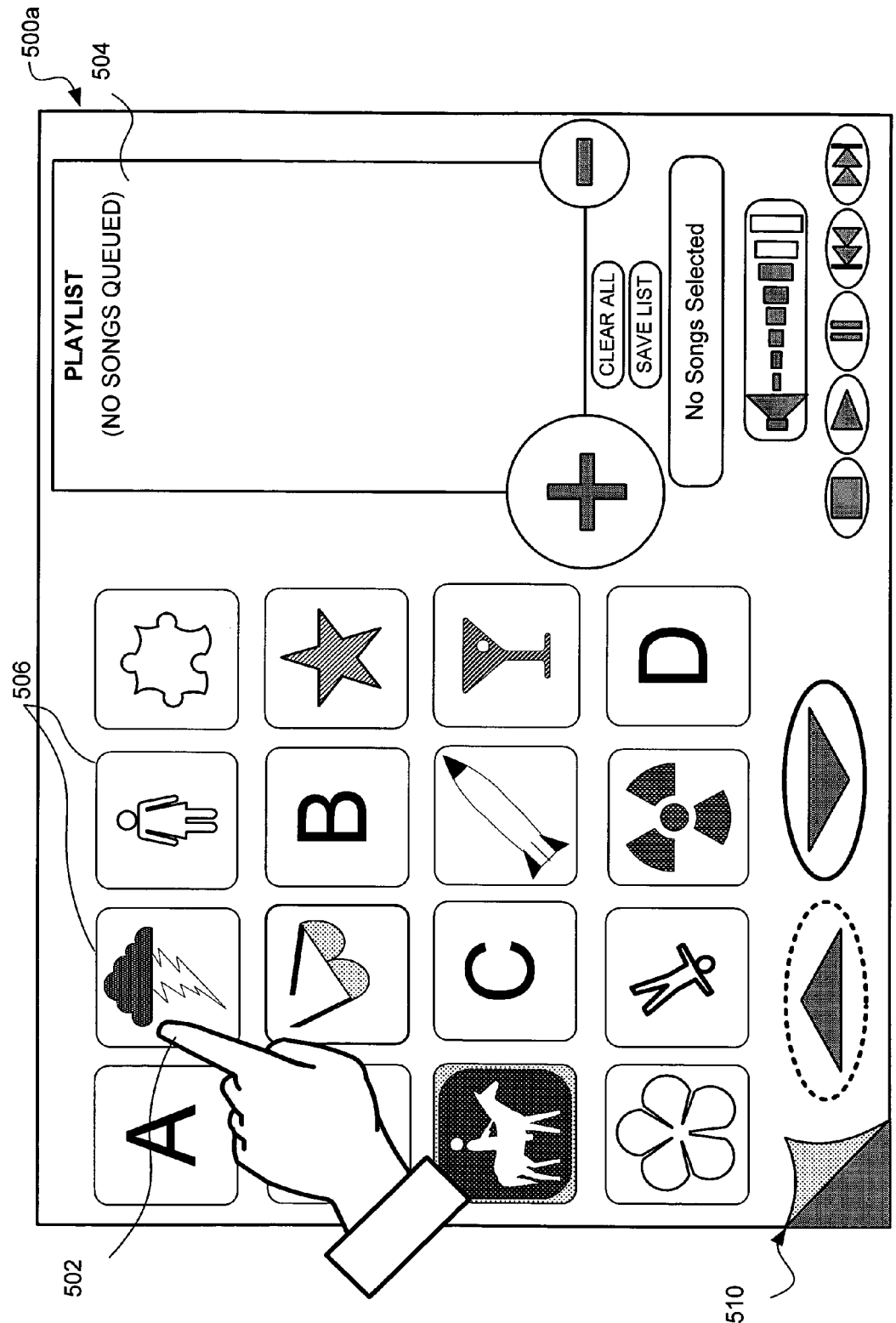
FIG. 5 is an interactive display surface image of a music player application including an embodiment of the present invention using a peel-back interface.

FIG. 5 shows a screen 500*a* from an interactive display surface presenting a music player application similar to that described in connection with FIGS. 2A-2B. Again, by using a physical object such as user's hand 502, a user can build a playlist 504 by touching or otherwise selecting icons 506 that represent one or more musical selections. In contrast to the music player application depicted in FIGS. 2A-2B, however, screen 500*a* does not include an exit icon 208 that is always visible on screen 500*a*. Instead, in this exemplary embodiment, a user accesses an exit icon by engaging a "peel-back interface" 510 at the lower right corner of the displayed user interface screen.

Figure 6A:
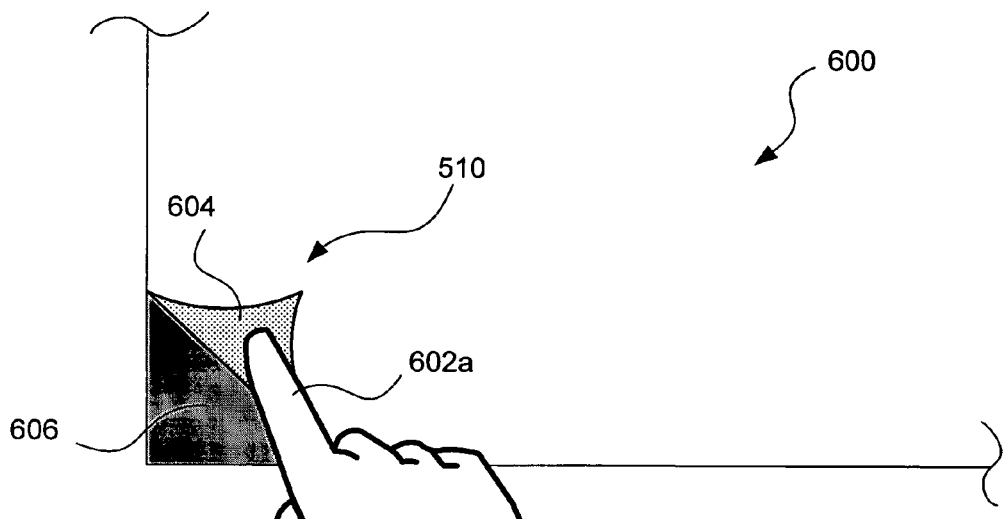

FIGS. 6A-6D depict this exemplary embodiment in use. FIG. 6A illustrates a corner 600 of screen 500*a*, showing an enlarged version of peel-back interface 510. To engage peel-back interface 510, in this exemplary embodiment, a user employs a physical object, such as the user's finger, which is shown at a first position 602*a*, to engage an access portion 604. Access portion 604, in this exemplary embodiment of the present invention, is graphically depicted as a flap as the flap would appear if physically, a corner 600 of the image of screen 500*a* as presented on the display were peeled back. In one embodiment, access portion 604 overlies a secondary interface area 606 before the access portion is "peeled back." In the example shown in FIG. 6A, secondary interface area 606 foreshadows a possibility that additional content is included beneath the flap of access portion 604, just as, by analogy, a loose flap of a top layer of wallpaper might foreshadow a previous wall covering under the top layer of wallpaper. Further, just as peeling back a loose corner of the top layer of wallpaper provides access to the wall covering that is covered by the top layer, manipulating access portion 604 allows a user further access to secondary interface area 606. As shown in FIG. 6A, a user engages access portion 604 by touching access portion 604 with the user's finger, although another external object, or a pointing device-controlled cursor could be used instead for this purpose.

Figure 6B:
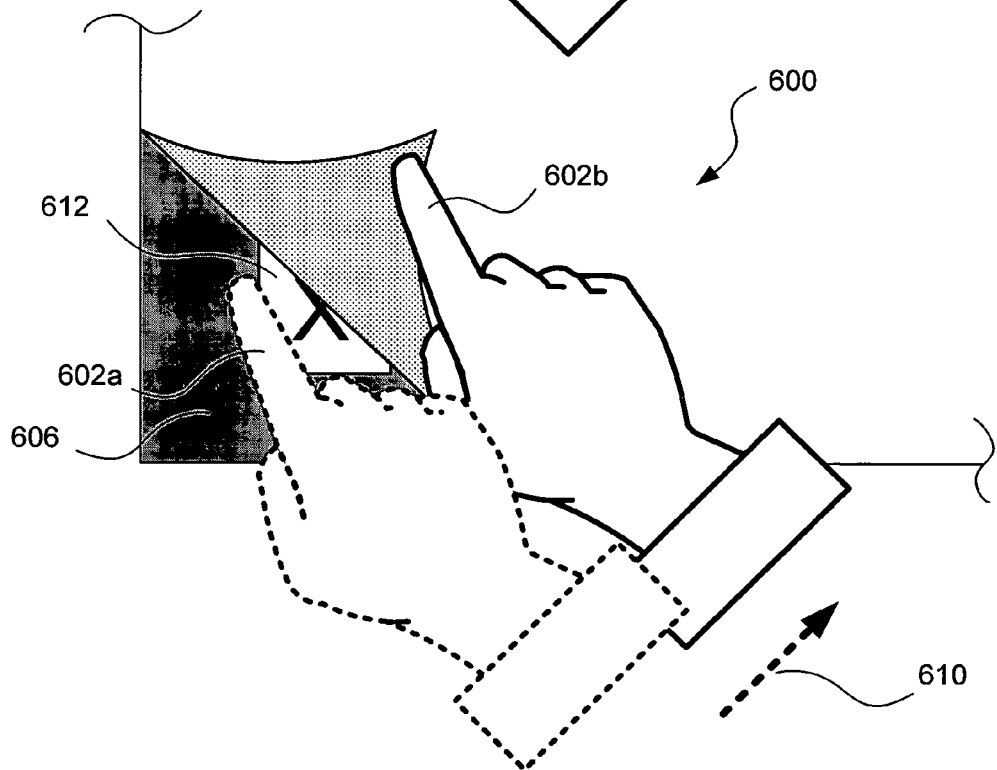
Figure 6C:
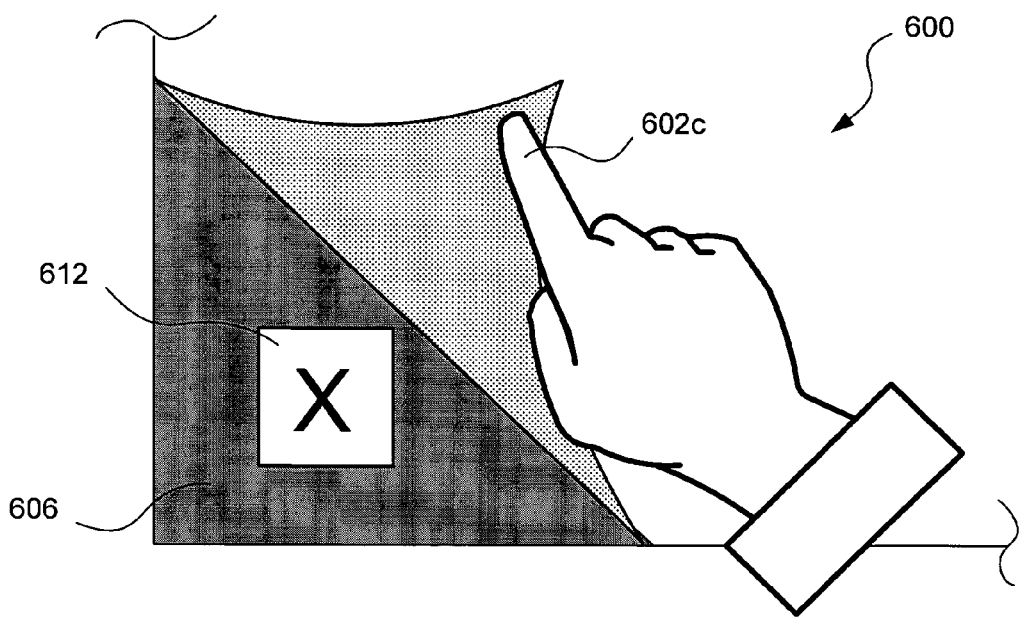
Figure 6D:
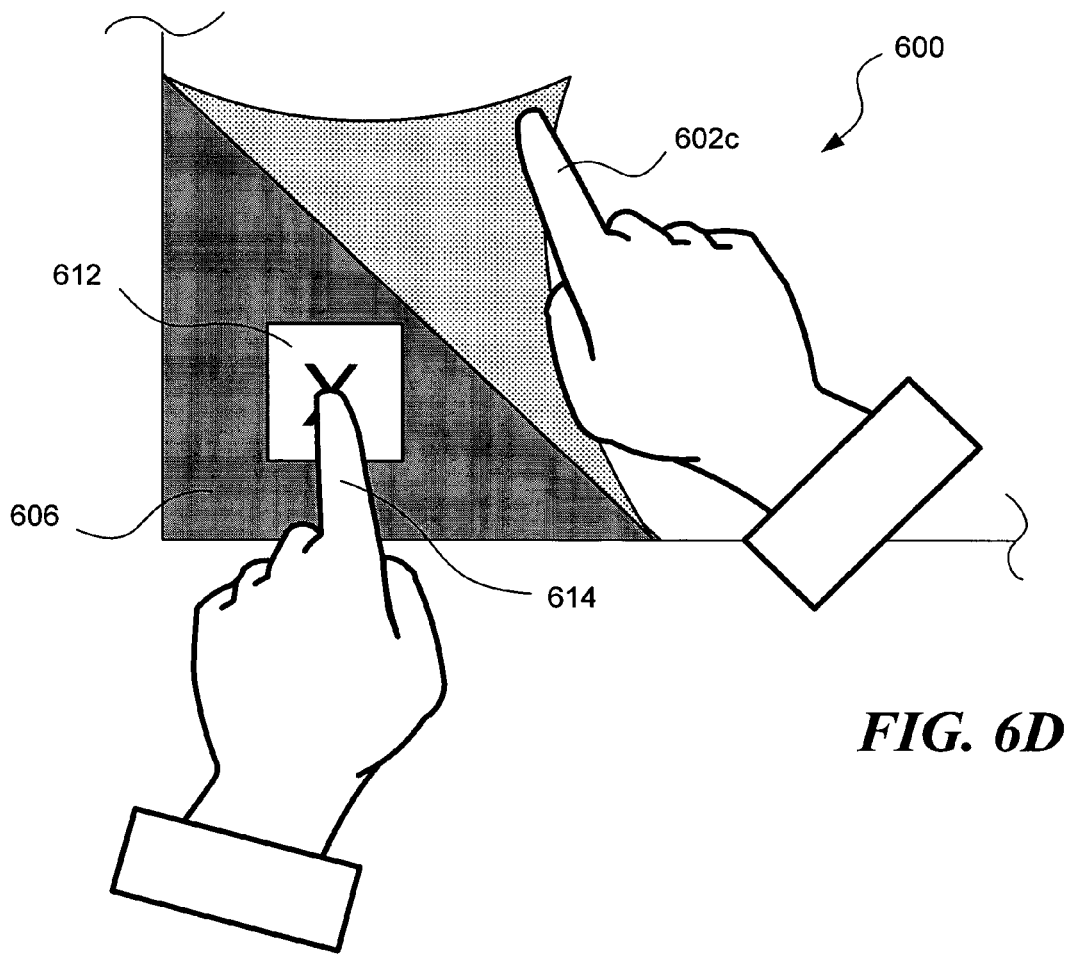

Having touched access portion 604, FIG. 6B shows corner 600 of the screen and movement of the user's finger from first position 602*a*, as shown in FIG. 6A, in the direction of arrow 610, to a second position 602*b*, causing the corner flap to be folded back further so that more of secondary interface area 606 is visible, and so part of an exit icon 612 is exposed. FIG. 6C shows corner 600 after the user's finger has continued moving inwardly of the displayed screen to a third position 602*c*, making still more of secondary interface area 606 visible to fully display exit icon 612, which had originally been hidden by the overlying display screen. Finally, FIG. 6D shows corner 600, illustrating how, while maintaining third position 602*c* to continue fully revealing the exit icon, the user engages now fully exposed exit icon 612 with another external physical object, such as a finger 614 on the user's other hand. The combined movements depicted in FIGS. 6A-6D enable user to first make the exit icon visible, and then select the exit icon to exit the application.

Three concepts should be appreciated from FIGS. 6A-6D. First, the peel-back interface illustrated prevents the user from accidentally exiting the application because the exit icon must be made visible before it can be selected and activated by the user. Thus, the exemplary embodiment operates much like a safety switch on a piece of equipment that must first be engaged before another switch can be used to activate the equipment. In this manner, potentially "destructive" functions such as an exit function, or other functions with potentially undesired consequences can be secured from inadvertent activation.

Second, because exit icon 612 was concealed by the overlying flap representing access portion 604 (see FIG. 6A), there is at least one less icon that must be fit onto the originally presented display screen. Certain functions that need not always be made visible in a graphics user interface can be kept hidden until the user takes a proactive action (e.g., peeling back the overlying corner flap) to make those functions visible for selection. As a result, the normally visible display screen can be made much less cluttered.

Figure 1A:
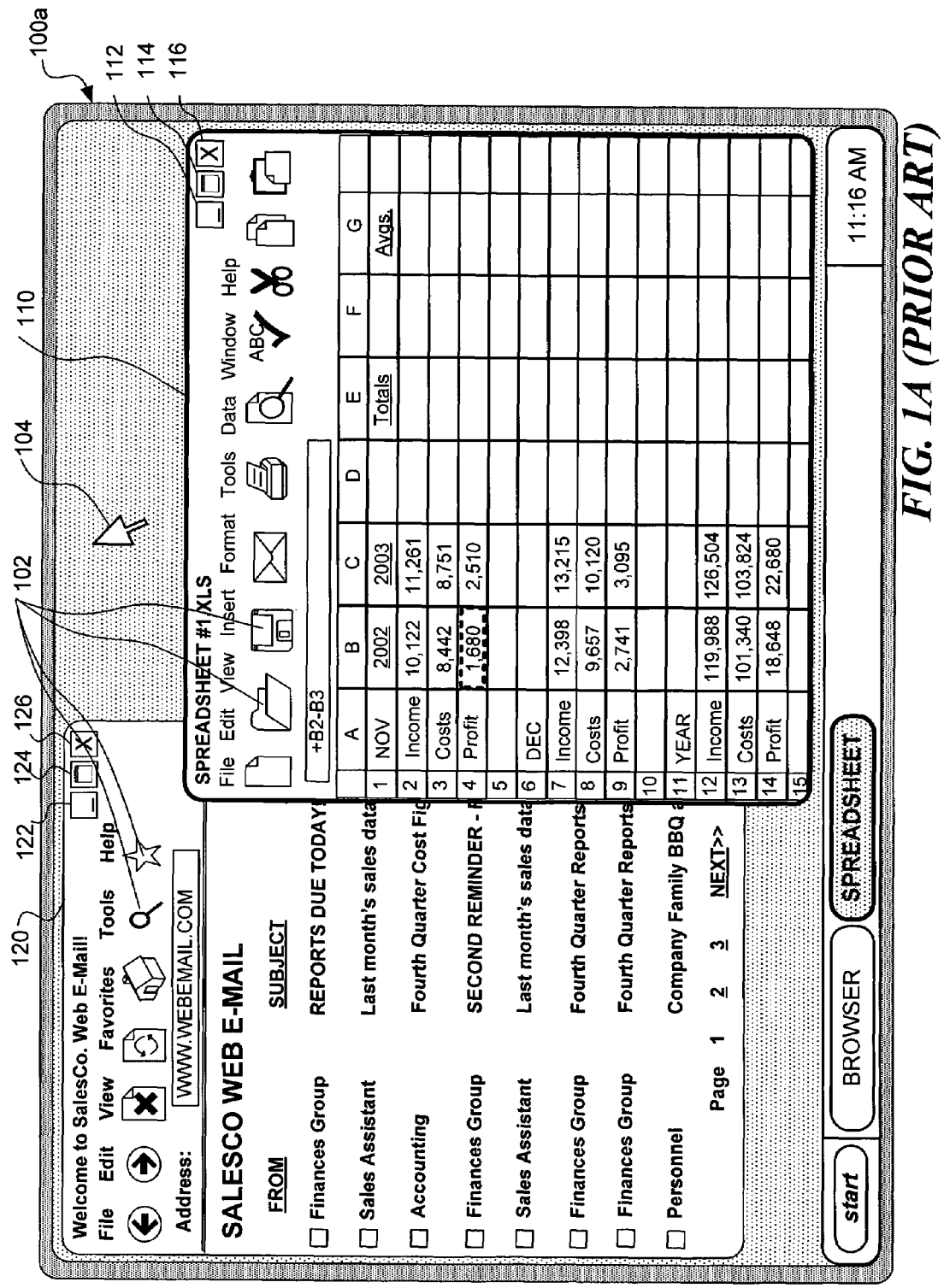
FIGS. 1A-1C (Prior Art) are graphical user interface screens through which a user can inadvertently exit one or more applications (or initiate other functions) by making an unintended control selection using a pointing device operated by the user.
Figure 1B:
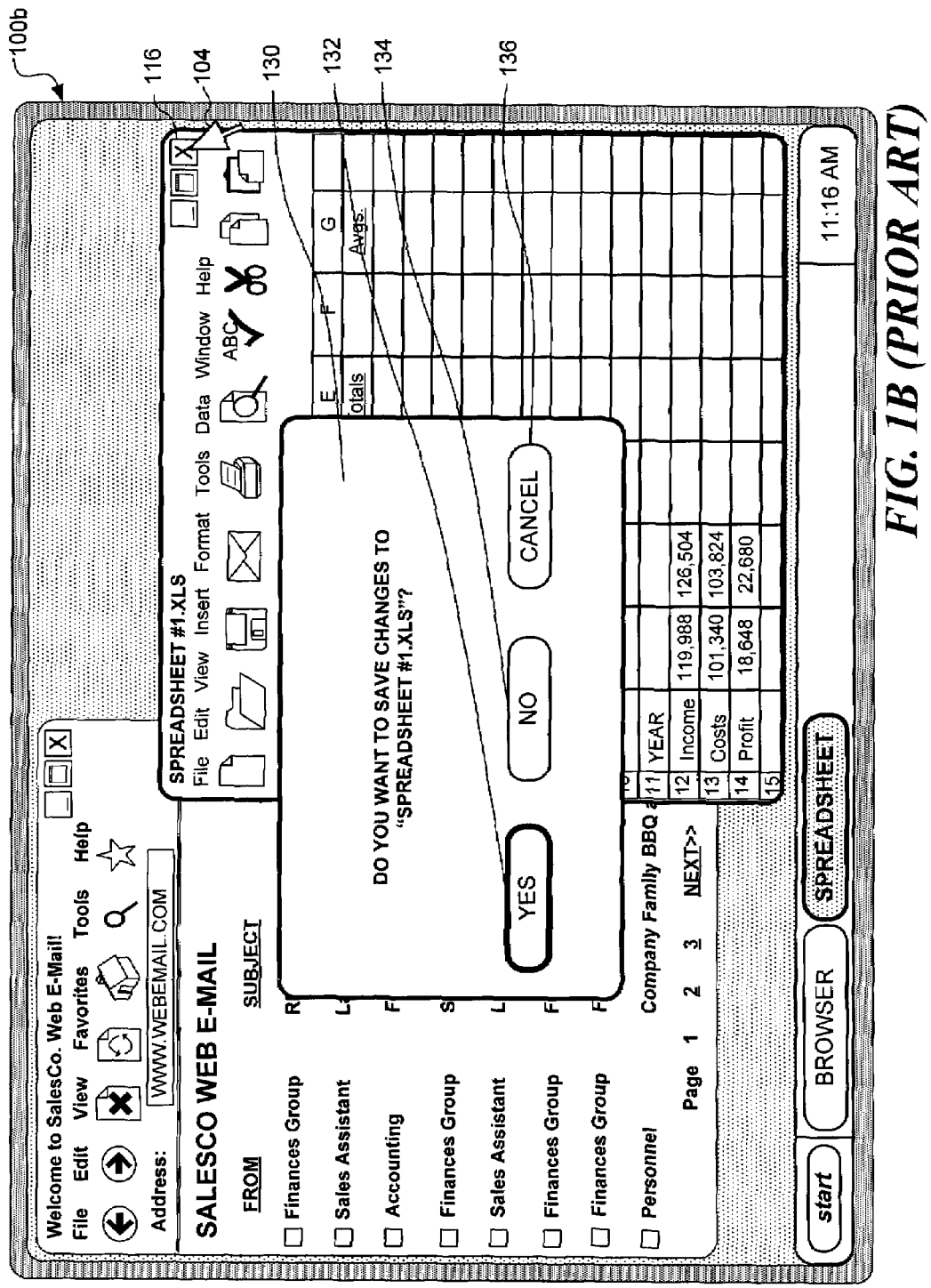
Figure 1C:
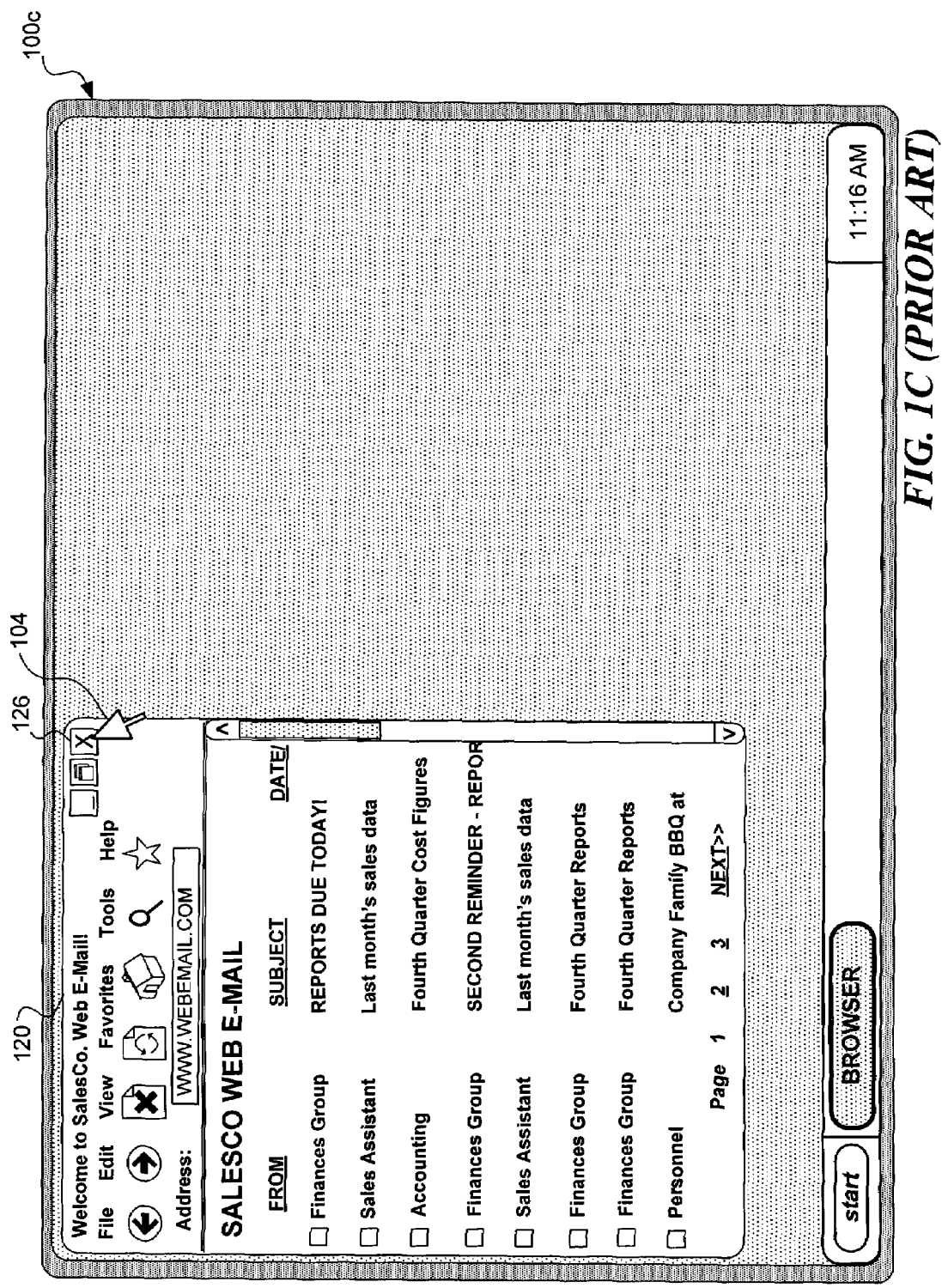

Third, in contrast to conventional confirmation dialog box 130 of FIG. 1B, if a user performs the necessary actions to expose the exit icon (or some other icon or control to initiate a function), the user need not wait for the confirming dialog and perform a second operation to close the application. Thus, in this example, if a user truly wishes to exit an application and manifests this intention by performing steps that are not likely to occur as a result of an inadvertent movement, the user can do so by causing the obscuring overlying displayed surface to be remove to reveal the underlying exit icon or control and then selecting the icon or control to exit the application.

Exemplary Variations of the Peel-Back Interface

Figure 7A:
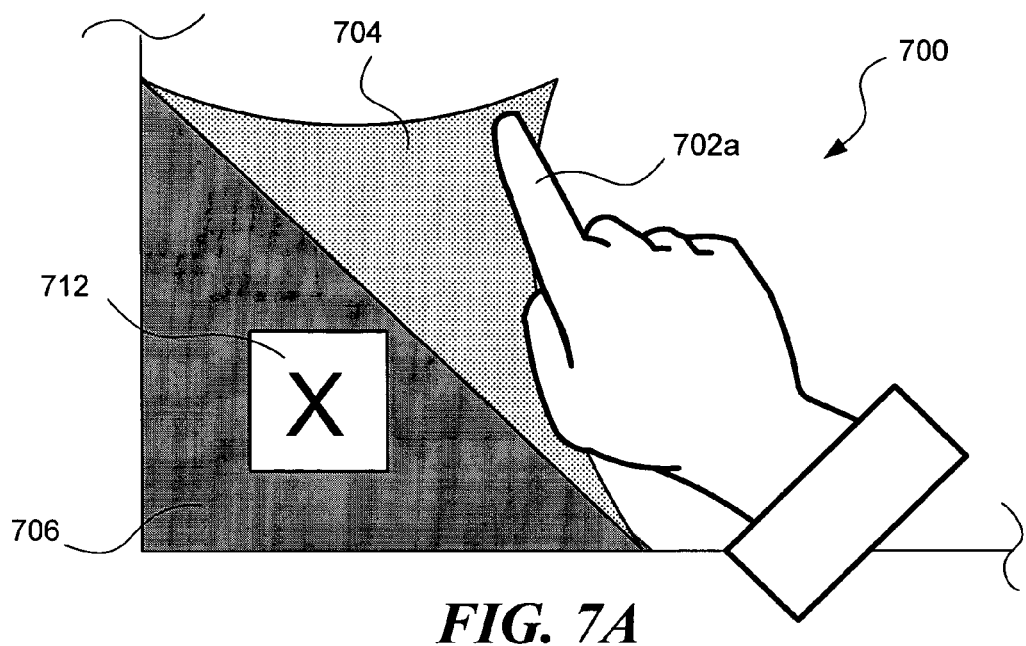
Figure 7B:
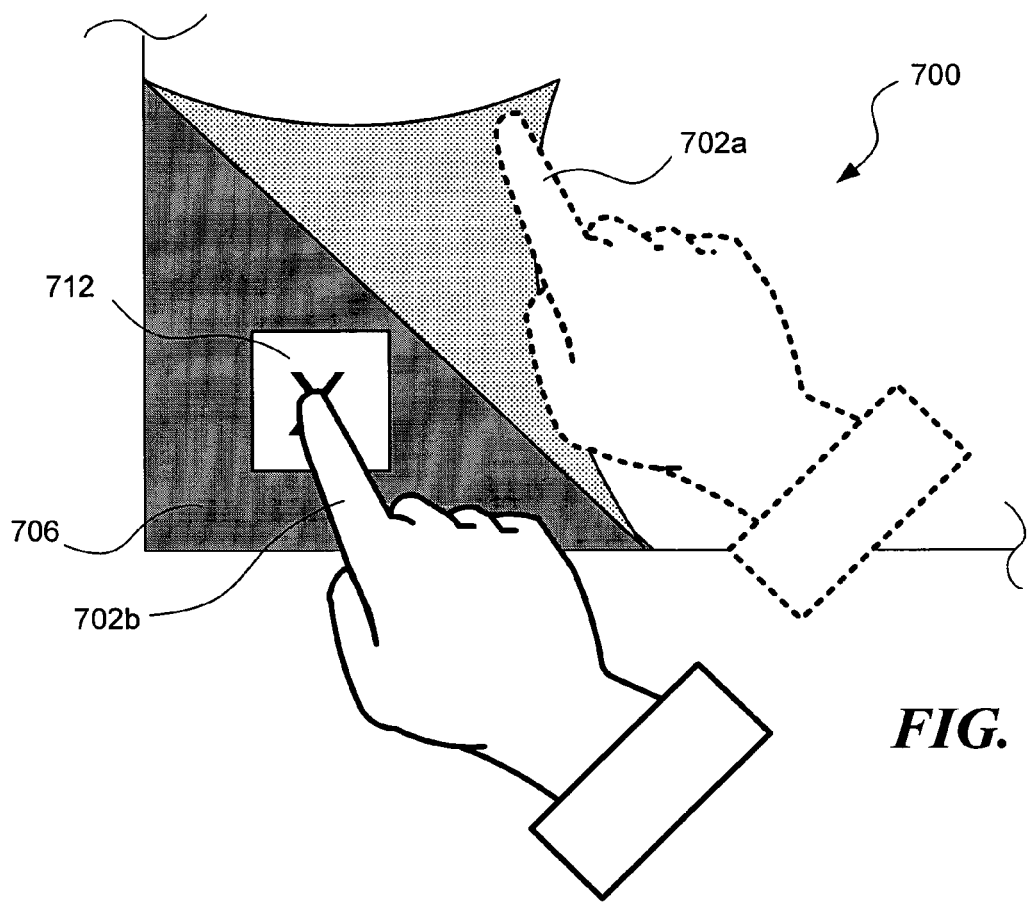

This interface is not limited to serial actions that first expose and then activate an icon or control in the secondary interface area. For example, FIG. 7A shows an enlarged corner 700 of a screen where the user's finger has been moved to a first position 702a and thereby drawn (i.e., peeled back) access portion 704 across the screen to make visible secondary interface area 706 and fully expose an exit icon 712. However, in this/embodiment, the user need not use a second external physical object to selectively activate exit icon 712. As shown in FIG. 7B, peeling back access portion 704 expose underlying secondary interface area 706 triggers a predefined time interval during which secondary interface area 706 remains visible, even if the user's finger is lifted from the first position 702a. As a result, the user can move the same finger to a position 702b to activate exit icon 712, for example, and thus exit the current application that is producing the current display screen. Like the embodiment of FIGS. 6A-6D, although the object used to peel back access portion 704 can be a single finger or other external object, the series of actions performed with the finger or object provides security against unintended activation of the functions represented by the one or more icons functions in the secondary interface area.

Figure 8A:
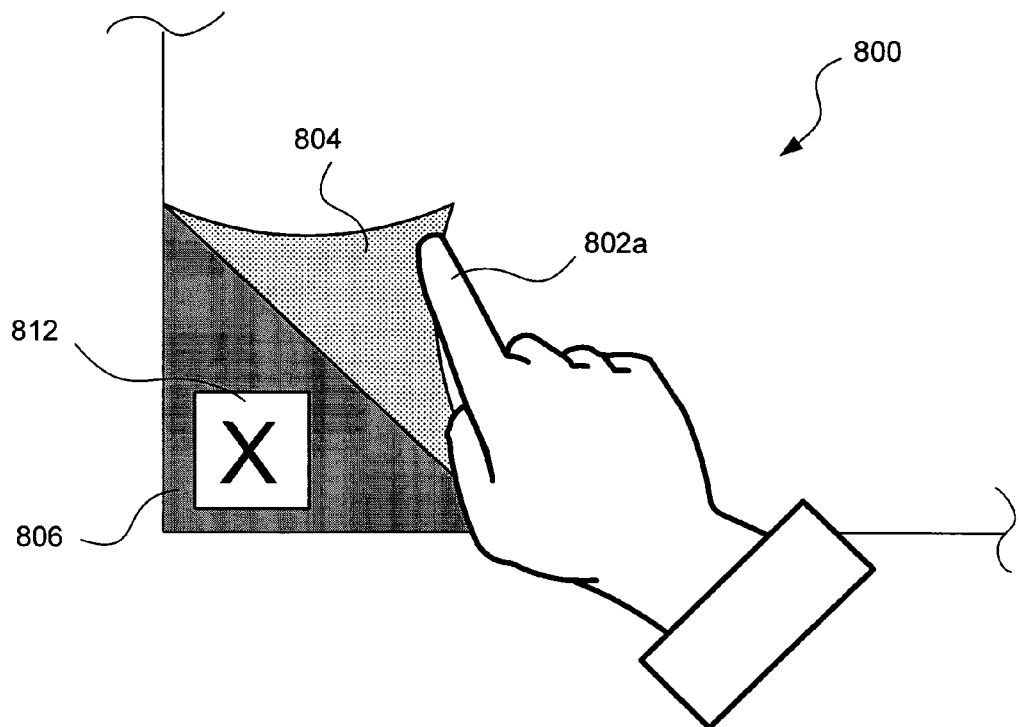
Figure 8B:
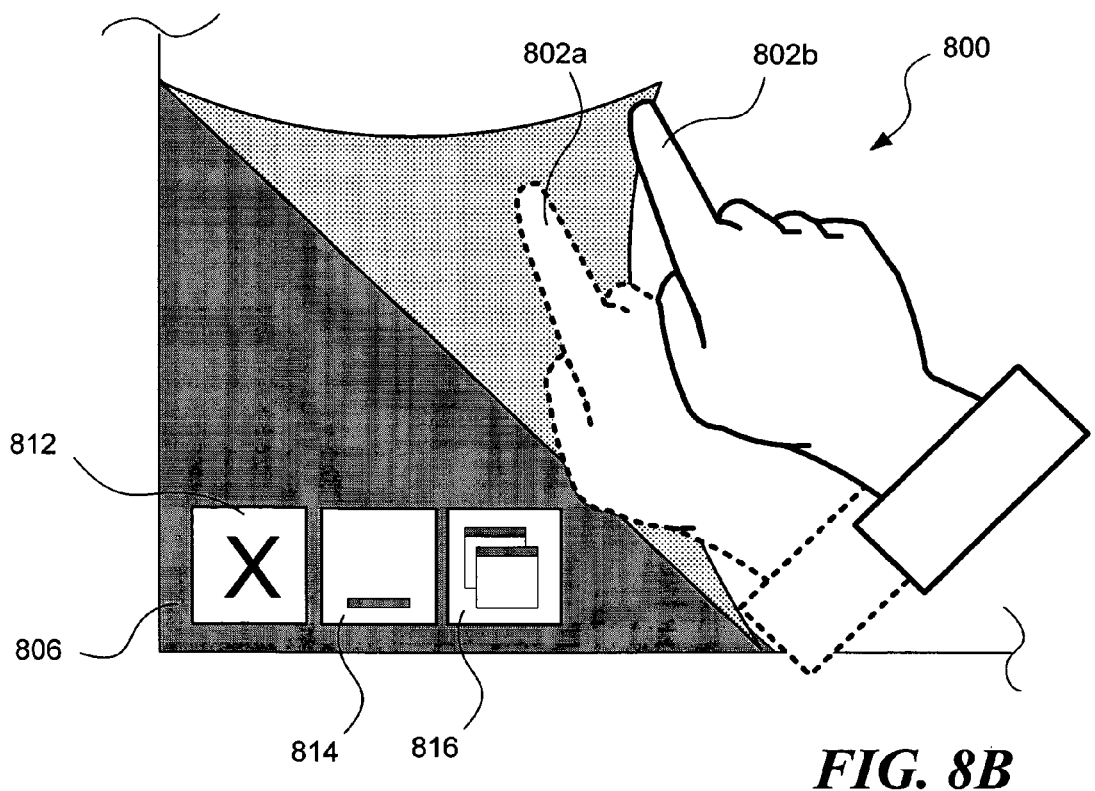

Embodiments are thus not limited to a secondary interface area having only a single icon, control, or function, or only to an exit function or other potentially dangerous functions. For example, FIG. 8A shows an enlarged view of a corner 800 peeled back from a secondary interface area 806, where the selection made with the user's finger, which is now at a first position 802a, has revealed and fully exposed an exit icon 812 that can be used to exit the current application. However, as shown in FIG. 8B, further movement of the user's finger to a second position 802b has revealed more of secondary interface area 806b. Secondary interface area 806b, in addition to exit icon 812, includes two additional icons 814 and 816 that are now fully revealed and visible. Thus, the exemplary peel back interface may be controlled to selectively reveal one, or successive additional previously concealed icons, controls, or functions.

User Selectable Invocation and Disposition of a Peel-Back Interface

This interface is not limited to concealing functions at a corner of a display. Embodiments of the present invention can present flaps that can be removed to provide visible access to a secondary interface area along an edge of a screen, or at any point of the screen. Furthermore, peel back interfaces can optionally also be invoked by a user on demand, and/or at a location of the user's choosing.

Figure 9A:
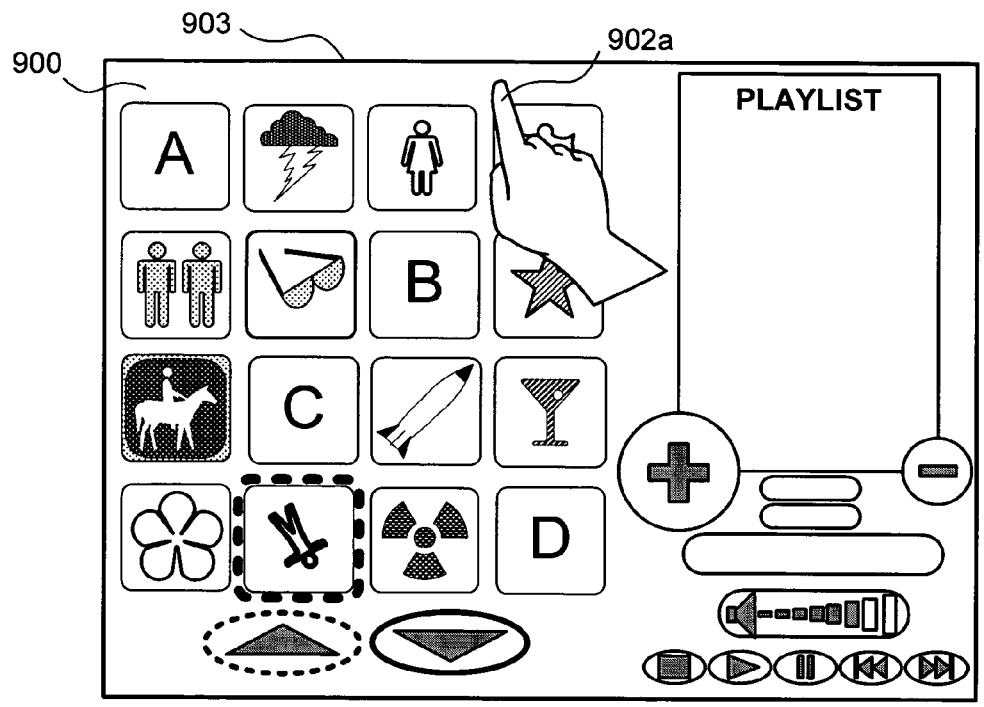

FIG. 9A shows an exemplary screen 900 presented by an interactive display interface. On screen 900, a user has placed one finger in a position 902a along an edge 903 of the current display screen. There is no flap or other indication of that action being able to provide access to a secondary interface area. However, by a predetermined movement or gesture, such as placing a finger or hand in an otherwise unused area of the display screen, or placing a finger or hand within a certain distance from any edge of the display screen, or placing a finger or hand on the display screen and leaving it in that position for at least a predetermined time interval, or tapping a finger or hand on the display screen a predetermined number of times, or by some other predetermined movement or gesture, an access portion to a secondary interface area can be generated by the user at the position where the movement or gesture is made, or at a predefined portion of the display screen.

Figure 9B:
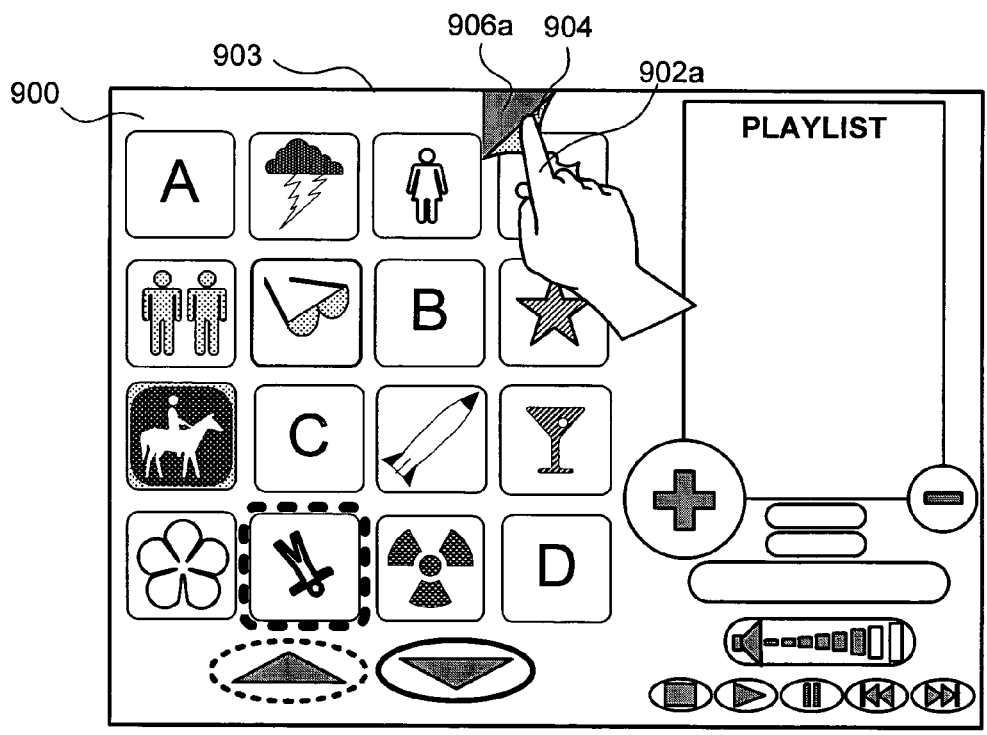
Figure 9C:
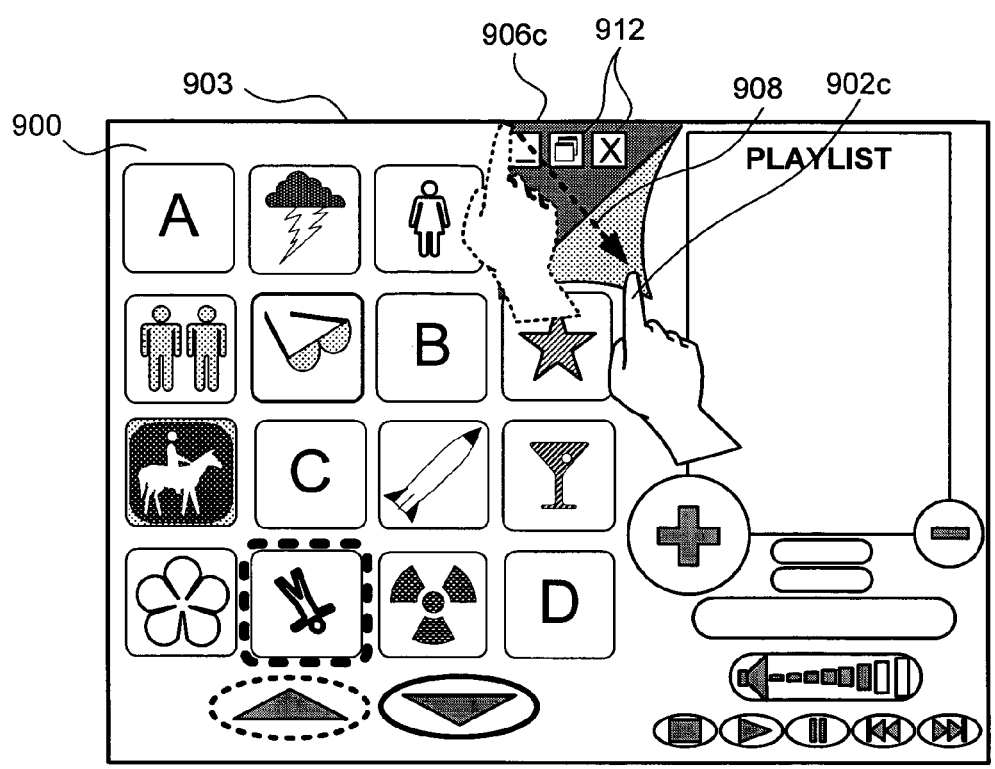

FIG. 9B shows a screen 900 with user's finger still in first position 902a. However, by perhaps tapping screen 900, holding user's hand in a first position 902a for a predefined time interval, or performing some other gesture, access portion 904 is peel back and secondary interface area 906a made to appear alongside edge 903 of display 900. Then, as shown in FIG. 9C, upon moving the finger (or the coded object) to a second position 902c away from edge 903 of screen 900c, a larger secondary interface area 906c is presented to the user. Secondary interface area 906c includes one or more icons 912 representing functions that are otherwise secured and/or concealed from the user by the overlying screen currently being displays in FIG. 9A. Icons 912 are thus made visible and accessible for selection wherever the user might like to have them appear by exposing them on the secondary interface area. The secondary interface area and the icons can be made visible anywhere on the screen according to the user's preference or convenience.

Instead of the user selectively invoking access portion 904 (FIG. 9B) to reveal and make visible secondary interface area 906 by performing a predetermined movement or gesture, an access position also could be selectively invoked by placing a physical object adjacent to the interactive display surface. A physical object may present an identifiable shape or an optical code recognizable by the interactive display surface and associated with making visible the secondary interface area. In one embodiment of the invention, the physical object might have a form or carry a marking that also readily enables the user to identify its function in removing the portion of the current image on the display screen that is hiding the secondary interface area.

Figure 10A:
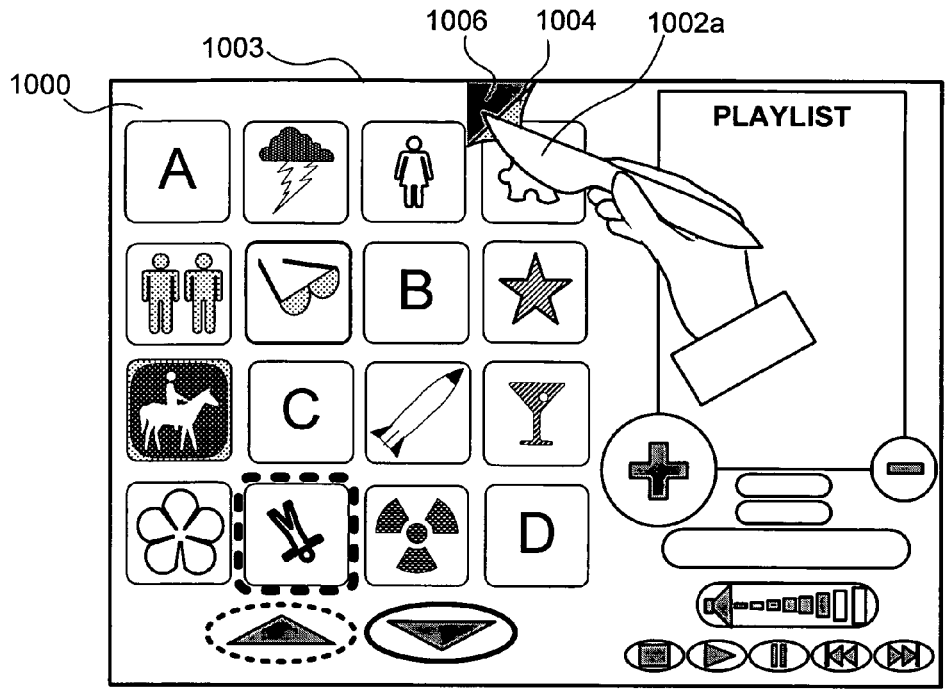
Figure 10B:
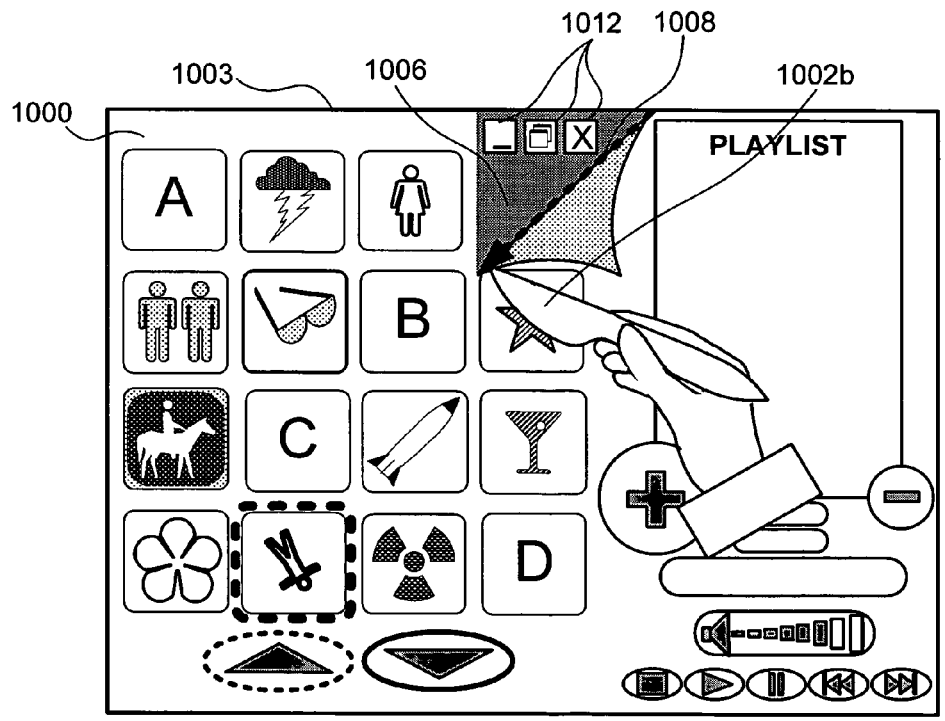

For example, as shown in the example of FIG. 10A, a physical object such as a knife-shaped object, which may be intuitively associated by a user with its use in piercing or cutting through current overlying image to reveal the underlying secondary interface area and thus enable the user access to functions or controls on the secondary interface area. A shown by a screen 1000 in FIG. 10A, when the knife-shaped object is placed in a first position 1002a adjacent to the interactive display surface, e.g., near an edge 1003 of screen 1000, access position 1004 is presented adjacent to a secondary interface area 1006. FIG. 10B shows that, as the knife-shaped physical object is moved in the direction of an arrow 1008, to a second position 1002b, it appears that the image currently being displayed by the active application is "cut away" to reveal more of secondary interface area 1006, presenting a plurality of exposed icons 1012 having functions that the user can now select and initiate. Exposed icons 1012 are activated by selecting them with the knife-shaped physical object (or with some other object) as described above.

Alternative Presentations of Secondary Interface Areas

FIGS. 4A-4B, 5, 6A-6B, 7A-7B, 8A-8B, 9A-9C, and 10A-10B all depict forms of a peel-back interface in which a corner, either at a corner of a display or appearing at an edge or at another point on the screen, is peeled (or cut away) to reveal a secondary interface area. However, embodiments of the interface are not limited to secondary interface areas that appear only in corners or as corners.

Figure 11A:
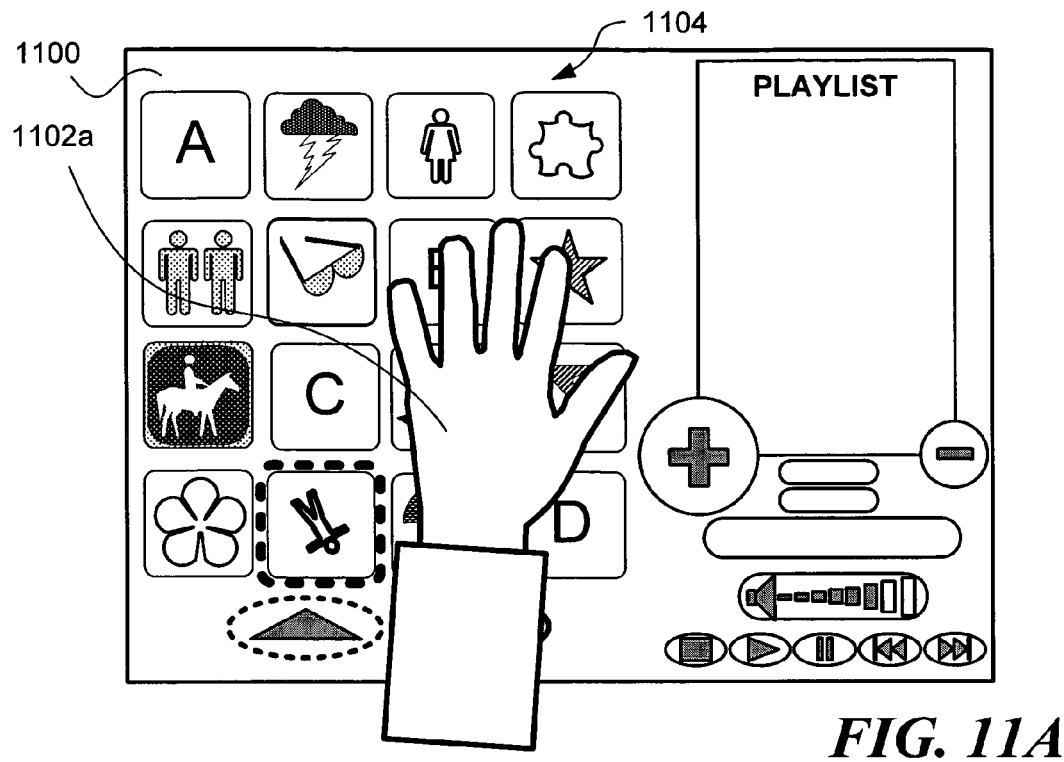
Figure 11B:
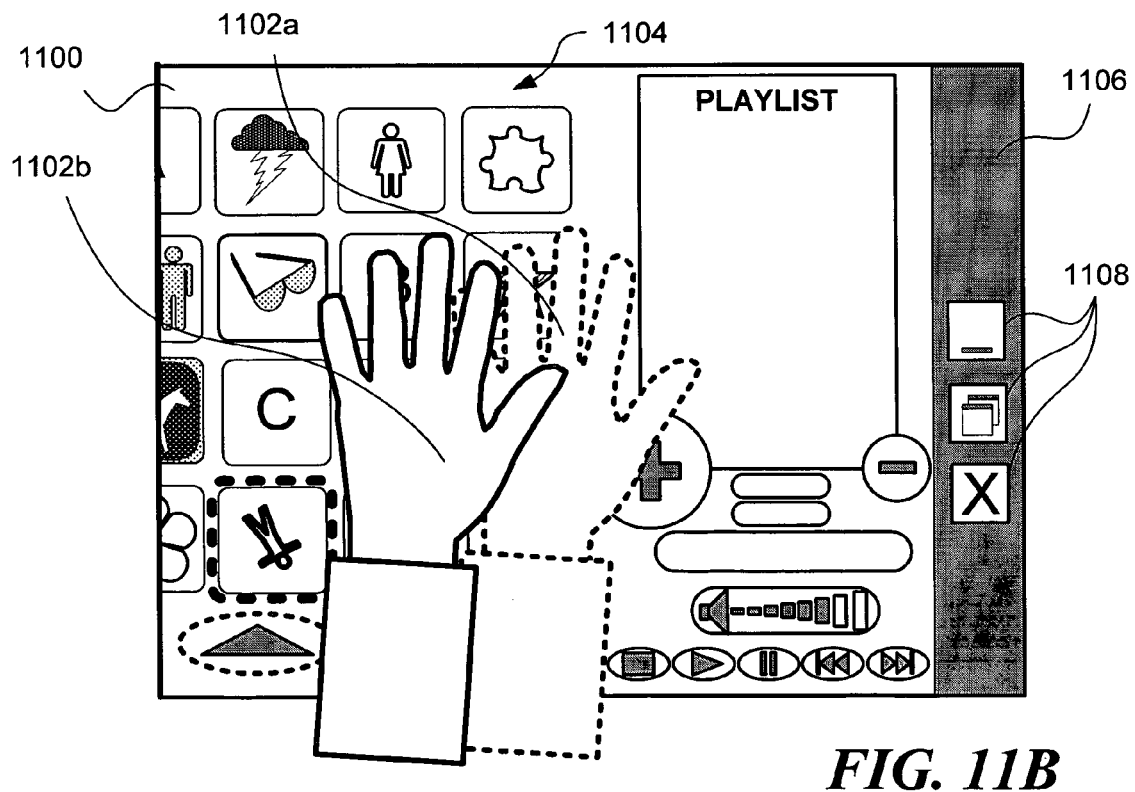

FIGS. 11A-11B show an embodiment of the interface where a secondary interface area is made visible and accessible by a "slideover" removal of the current image to expose the underlying secondary interface area. Screen 1100 of FIG. 11A shows an external physical object, in this case a user's hand, placed at a first position 1102a over an application screen 1104a. To access the underlying secondary interface area, the user slides the hand across the interface display surface as shown in FIG. 11B. As shown therein, when the user's hand is moved from a first position 1102a to a second position 1102b, application screen 1104 is partially slid "off" the display surface, i.e., so that the part of the application now slid beyond the edge of the display screen is no longer visible. Appearing in an area previously covered by application screen 1104 is secondary interface area 1106. By sliding the user's hand across the interactive screen, secondary interface area 1106 has been exposed so that it now visible and access is provided to a plurality of icons 1108.

In such an embodiment, the interactive display surface is configured to distinguish another sliding- or dragging-type command from an attempt to invoke the secondary interface area. For example, the action of a user attempting to access the secondary interface area can be based upon the interactive display surface recognizing the disposition of a physical object that spans more than a predetermined area and detecting that the physical object is being slid across the interactive display surface. Alternatively, and as described above, a user may signal an intention to access the secondary interface area by performing a particular gesture with the user's hand or finger(s), such as by tapping the user's finger on the interactive display surface, or by holding the finger or hand in one position adjacent the interactive display surface for at least a predetermined interval of time before sliding the hand across the interactive display surface.

Figure 12A:
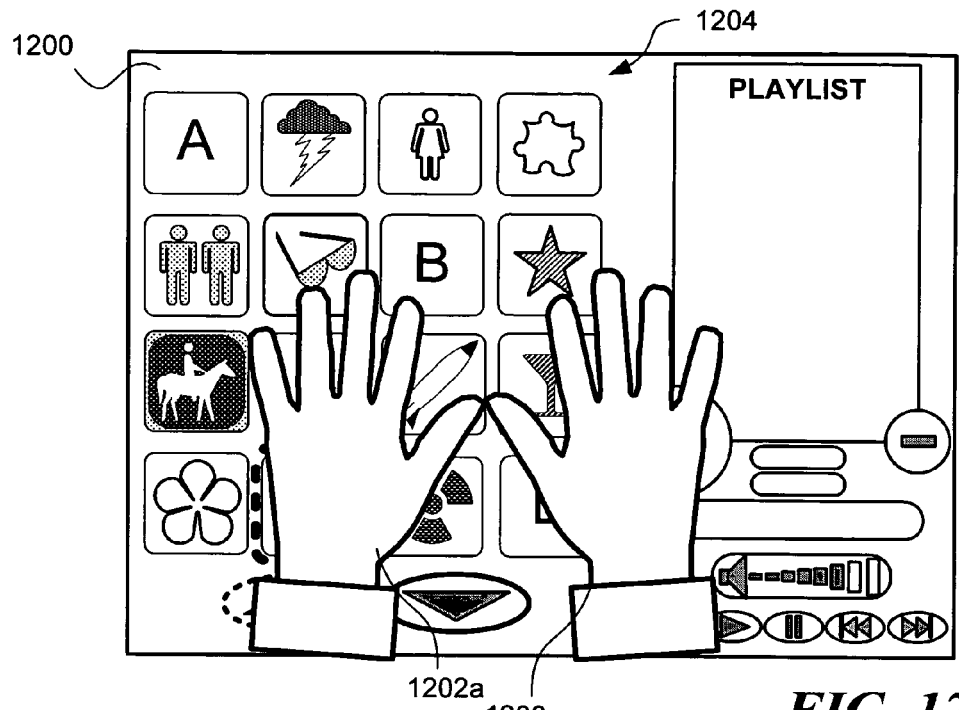
Figure 12B:
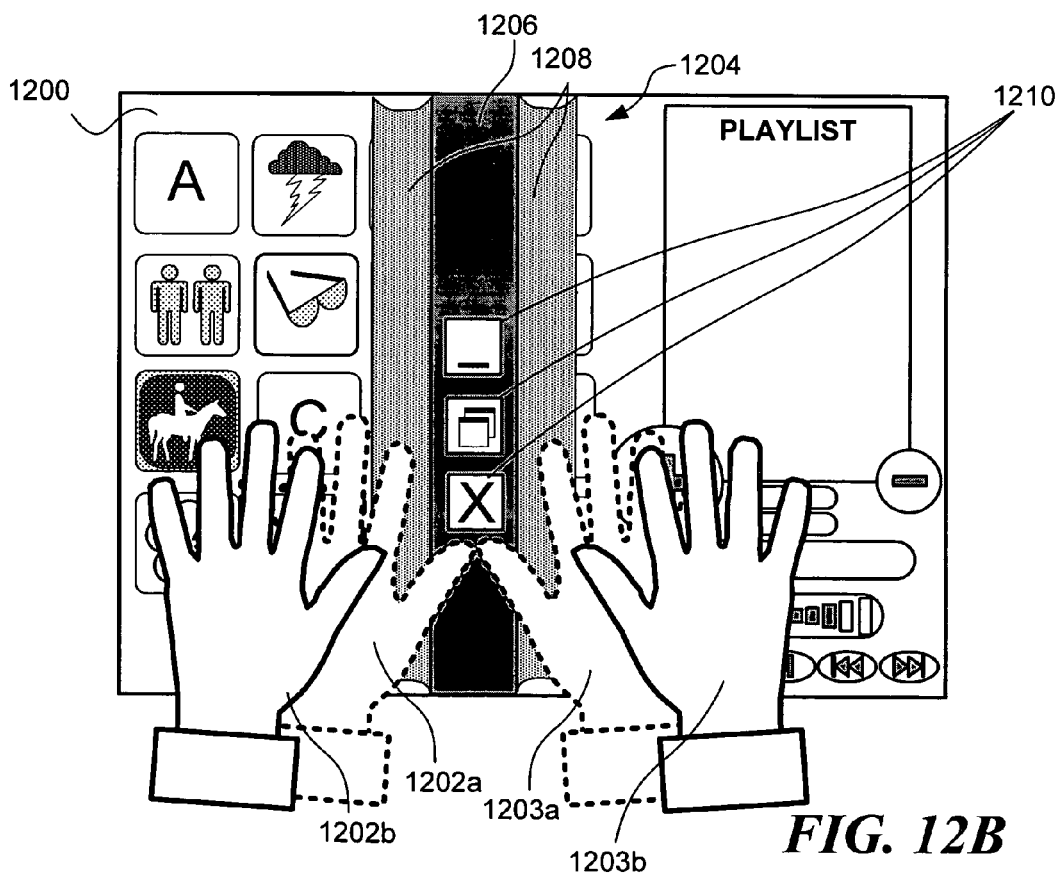

FIGS. 12A-12B show another embodiment of the interface where a secondary interface area is accessible using a "pull apart" technique. Screen 1200 of FIG. 12A shows two physical objects, in this case both of the user's hands, placed at first positions 1202a and 1203a over a currently displayed application screen 1204a. To access a secondary interface area, the user pulls these two hands apart from each other by sliding one or both across the interface display surface, as shown in FIG. 12B. When the user's hands are moved from first positions 1202a and 1203a to second positions 1202b and 1203b, respectively, a gap is formed within currently displayed application screen 1204. Appearing in this gap is a secondary interface area 1206. In one embodiment, secondary interface area 1206 is bordered by flaps 1208 to reinforce and enhance the "pull apart" visual effect. Once revealed, secondary interface area 1206 presents a plurality of previously concealed icons 1210, or controls, or functions.

Figure 13A:
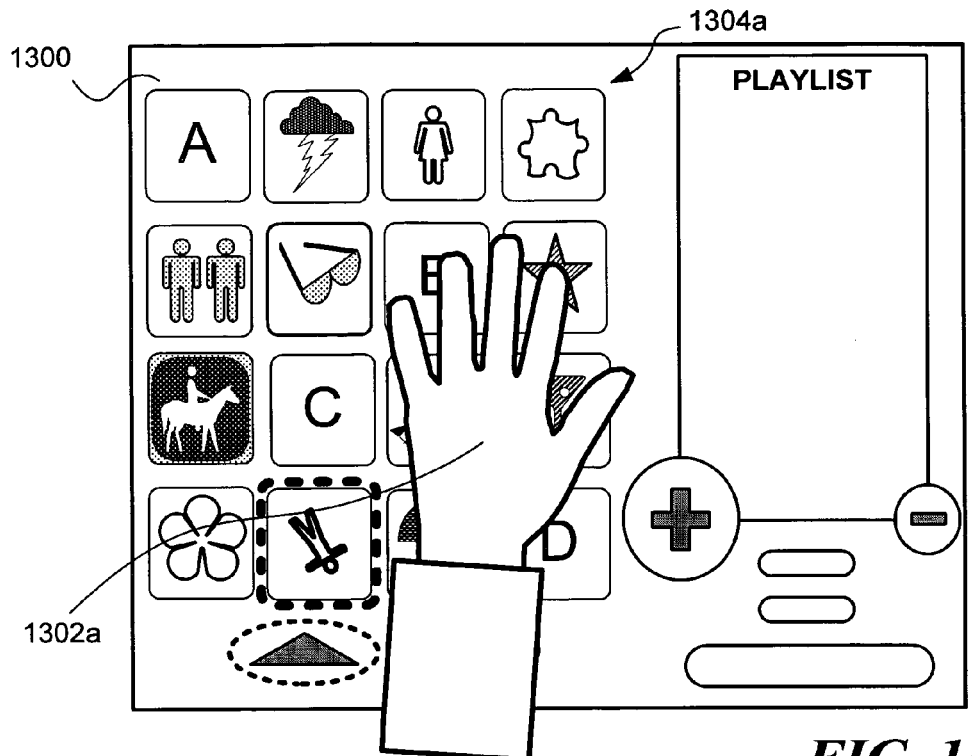
Figure 13B:
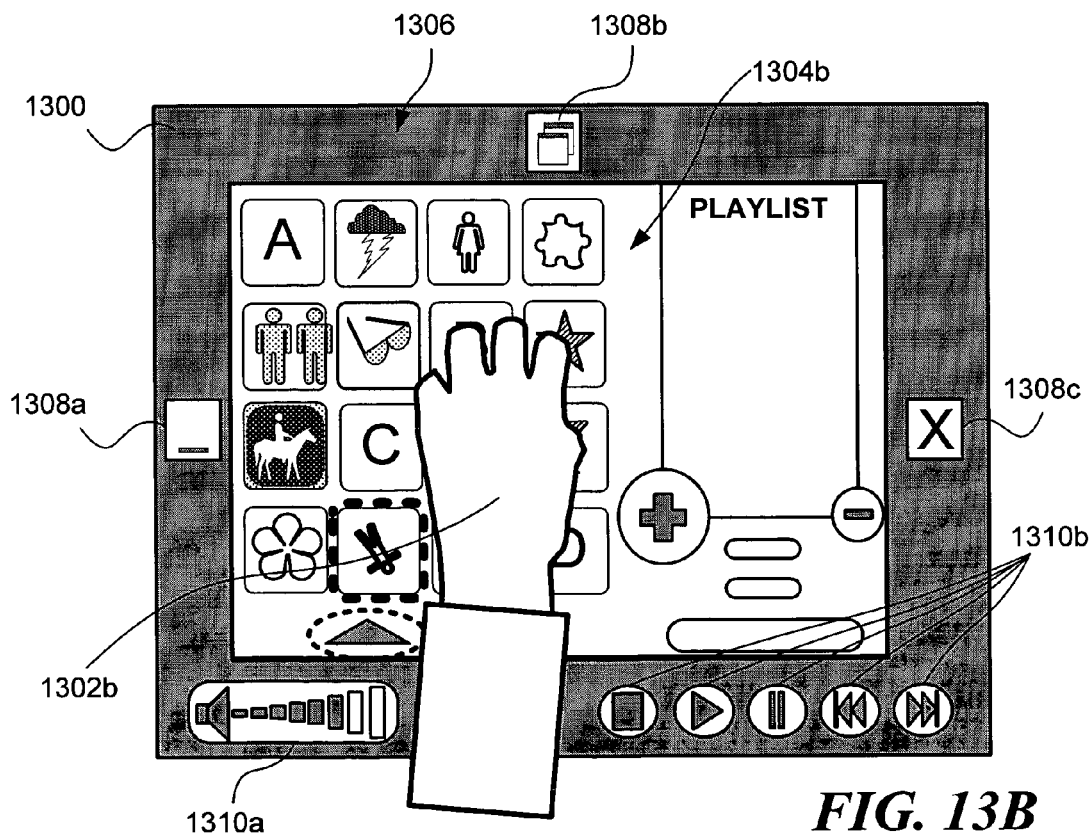

FIGS. 13A-13B show another embodiment of the interface where a secondary interface area is accessible through a "crumpling" visual effect. A screen 1300 in FIG. 13A shows a user's hand placed in a flat, fingers extended-configuration 1302a over a currently displayed application screen 1304. To access a secondary interface area 1306, the user squeezes the hand into a "crumpled" configuration 1302b over the interface display surface as shown in FIG. 13B. As shown, when the user's hand is the crumpled configuration, application screen 1304b is reduced in size, drawing back or contracting from one side or all four sides of the interactive display surface (as shown in FIG. 13B). Appearing around contracted application screen 1304b and visible is secondary interface area 1306. In such an embodiment, the interactive display surface is configured to recognize the crumpling motion of the user's hand, for example, by recognizing the reduction in the area occupied by the hand as it is configured with the fingers forming a fist.

As shown in FIG. 13B, a trio of icons, including minimize icon 1308a, window sizing icon 1308b, and exit icon 1308c are now visible and accessible by the user within secondary interface area 1306. Icons 1308a, 1308b, and 1308c similarly have been presented in the secondary interface area, in other embodiments discussed above. However, in addition to icons 1308a, 1308b, and 1308c, secondary interface area 1306 also provides access to a number of functions specific to the application presented by application screen 1304b. Thus, in this example, the normal or current display of a music player application presented by application screen 1304b is made less visually crowded by disposing volume control icon 1310a and player control icons 1310b, including stop, play, pause, etc., within secondary interface area 1306.

Also, in this exemplary embodiment, as in other embodiments, the user can selectively engage any of the functions represented by icons 1308a-1308c and 1310a and 1310b by holding the hand in crumpled position 1302b while selecting one of the icons with a finger on the opposite hand or with another external physical object. Alternatively, the interactive display surface can maintain application window 1304b in a contracted size for a predetermined interval, enabling the user to select one of the icons with the same hand.

Figure 14A:
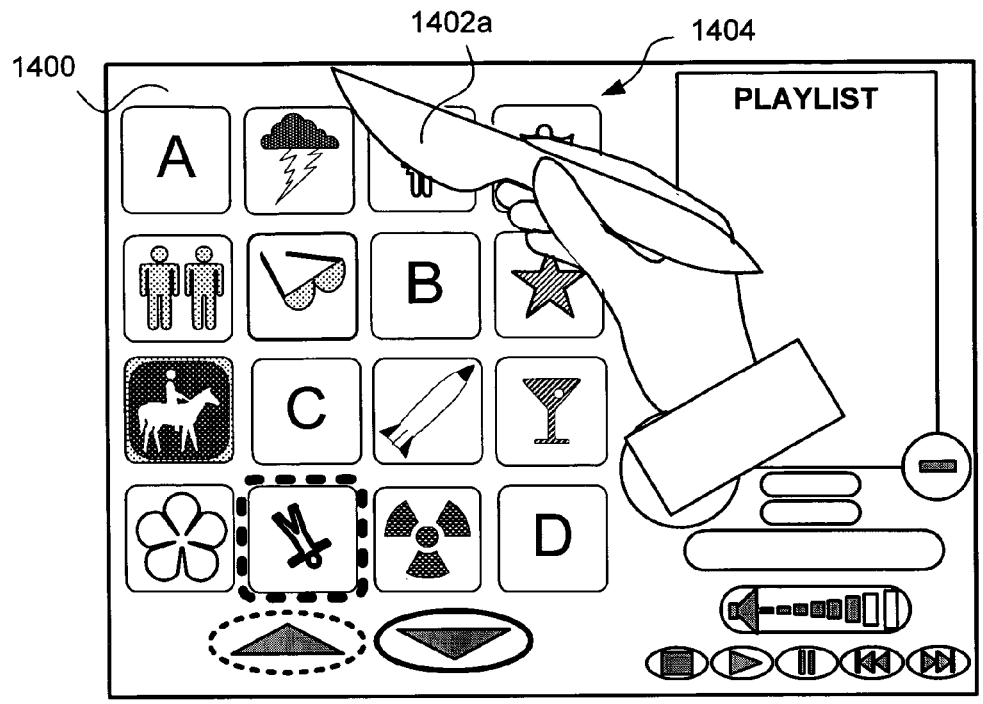
Figure 14B:
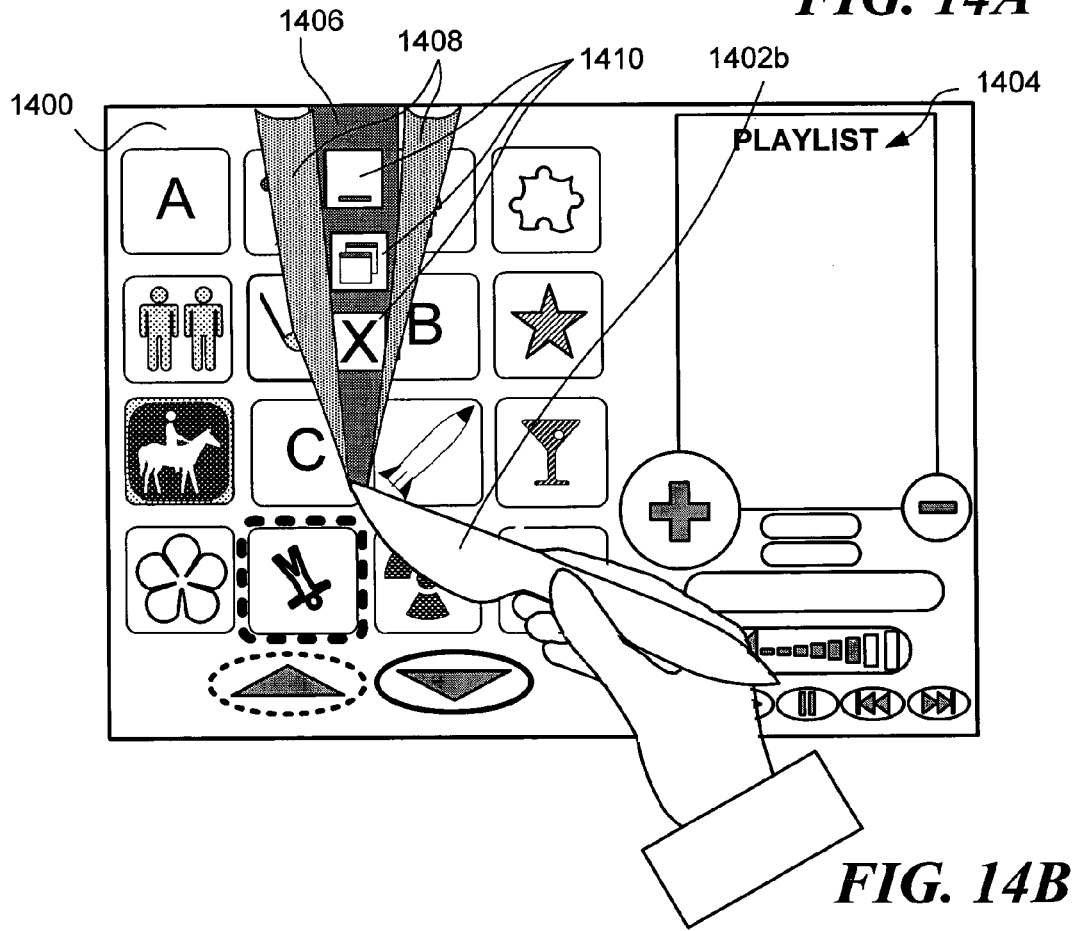

FIGS. 14A-14B show an embodiment where a secondary interface area 1406 is accessible via a "cut-through" visible effect. Screen 1400 of FIG. 14A shows a physical object, in this case the knife-shaped object, placed at a first position 1402a over an application screen 1404. The knife-shaped object is once again chosen because it appropriately signifies how the physical object will interact with the current image on interactive display surface to provide access to the secondary interface area. As shown in FIG. 14B, to access a secondary interface area, the user slides the physical object across the interface display surface to a second position 1402b. Sliding the physical object to second position 1402b causes an opening to form in the current displayed image, exposing underlying secondary interface area 1406. Secondary interface area 1406 is bounded by virtual flaps 1408, which reinforce the intended cut-through nature of the visual effect. The secondary interface area 1406 once again includes a plurality of icons 1410 the user can selectively activate to initiate any of the functions associated with these previously concealed icons. Although the example of FIGS. 14A-14B uses a knife-shaped physical object, it will be appreciated that any other suitable physical object having a shape or coding recognizable by the interactive display surface may be used. Similarly, embodiments where such a physical object is used are not limited to visualizing the access to the secondary interface area by simulating cutting through an application screen, but can employ other types of visual effects.

Secondary Interface Areas Including Additional Application Screens

As illustrated in a number of the embodiments discussed above, the secondary interface area may be accessed by a predetermined action of the user to gain access to one or more icons or controls representing functions desirably removed from the current application screen. However, embodiments of the interface enabling the user to access a secondary interface area to use functions that are available therein are not limited to providing access to a range of functions associated with the application currently presented on the display. Instead, this interface is also usable to enable a user to access a wide range of functions not necessarily related to the current application including, for example, functions in another application that is being executed, or controls that enable execution of another application to be started.

Figure 15A:
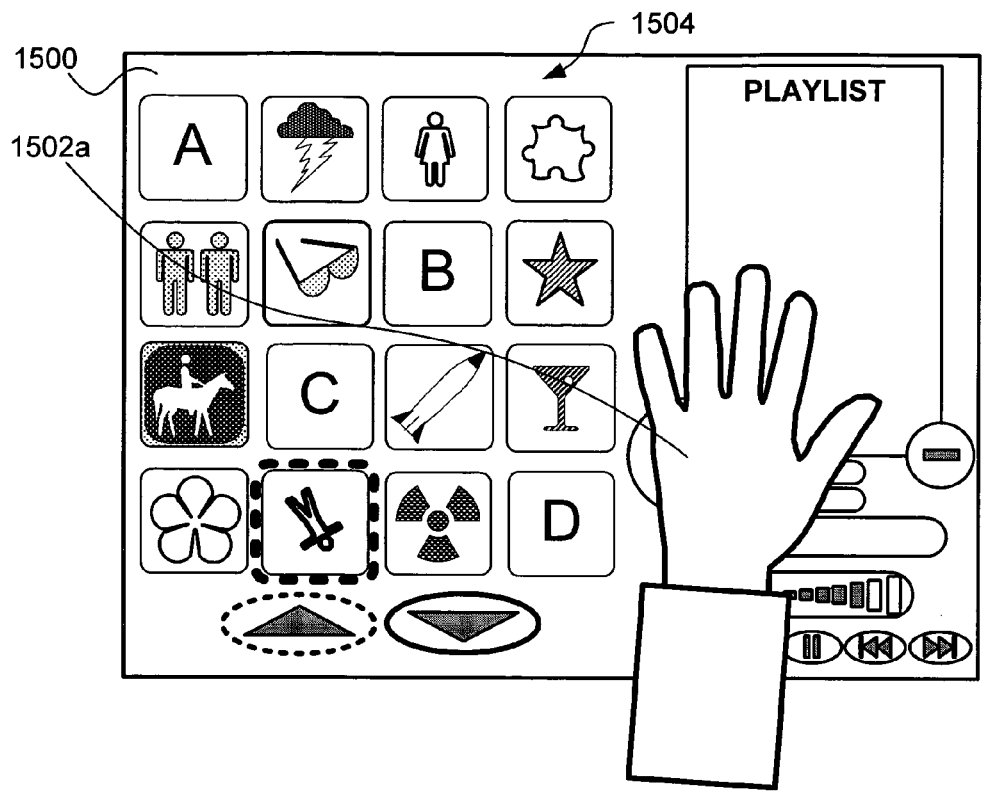
Figure 15B:
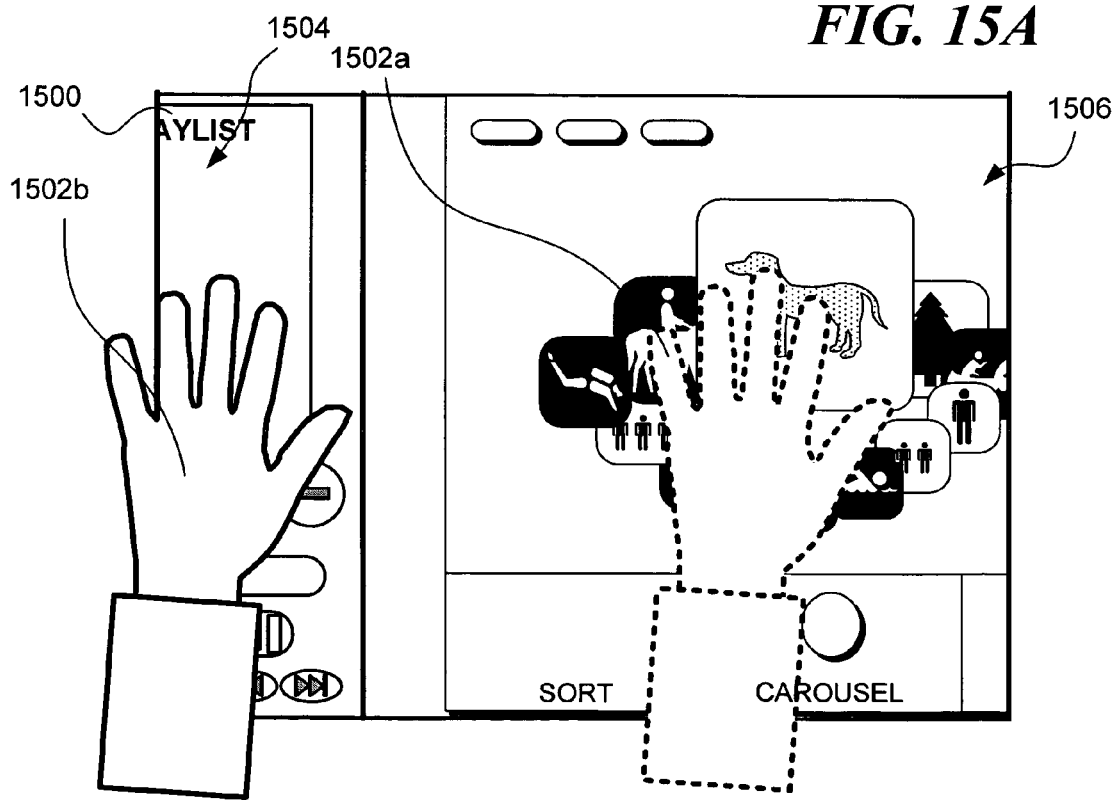

FIG. 15A-15B show an embodiment of the interface where a secondary interface area is for a different application. Using a "slide-over" visual effect, as described in connection with FIGS. 11A-11B, a user places a physical object, such as the user's hand, in a first position 1502a over application screen 1504 of a screen 1500. Then, as shown in FIG. 15B, the user's hand is moved to a second position 1502b which, as shown in the Figure, extends at least partially off screen 1500. Moving the user's hand to second position 1502b drags first application screen 1504 off the screen, exposing secondary display area 1506 in which a different application is running. Access to this different application, that was previously overlaid by application screen 1504, is now available. In this manner, instead of entering a combination of keystrokes, selecting a system button, or performing some other action used in conventional interfaces to access a different running application, the user can access another running application (or the icons, controls, and/or other functions of the other application) by in effect, simply sliding one application at least partially off of the visual workspace, to make the other application visible.

It should be appreciated that changing to another application in this manner may be triggered by using a physical object having a specific shape or coding that is recognized by the interactive display surface, to slide the current application screen over and at least partially off the display. Alternatively, as compared to the exemplary embodiment of FIGS. 11A-11B, accessing a secondary interface area to enable selective user access to functions for the current application, rather than exposing another running application may be differentiated by the distance that the user-slides the physical object to move the current display screen. As a further alternative, applying the flat of user's hand or just the fingertips may determine whether hidden functions for a current display screen or a different application are made visible by sliding the user's hand across the interactive display screen.

Figure 16A:
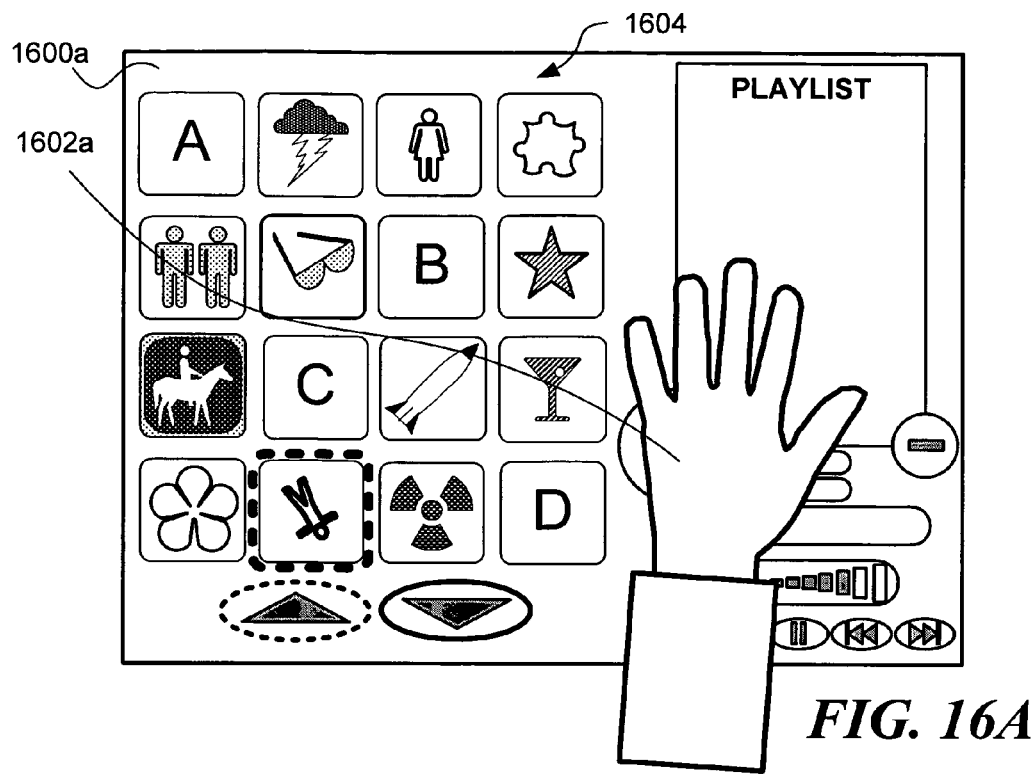
Figure 16B:
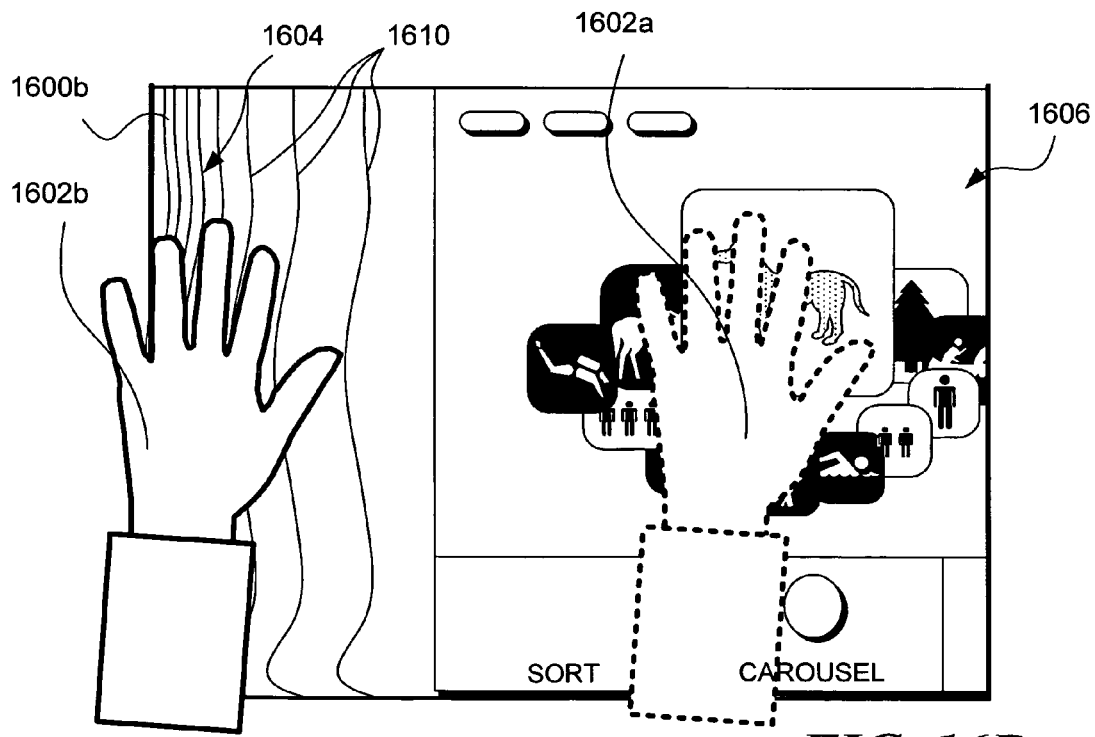

It also should be appreciated that a variety of graphical effects can be used to signal access to the secondary interface area to confirm the user's choice, as well as entertain the user, as exemplified in FIGS. 16A-16B. Screen 1600a of FIG. 16A shows a user placing a physical object, in this case the user's hand, at a first position 1602a on application screen 1604. As shown by a screen 1600b on FIG. 16B, when the user's hand is moved to a second position 1602b and secondary interface area 1606 representing another application moves onto screen 1600b, application screen 1604 "crumples" as represented by a number of fold lines 1610.

Embodiments that do not Require an Interactive Display Surface

The embodiments discussed above illustrate the use of the interface in connection with an interactive display surface. However, embodiments of the interface can also be controlled by keyboards and/or pointing devices. Screen 1700a of FIG. 17A shows a spreadsheet application 1704 using one such embodiment. Compared to the conventional spreadsheet application illustrated in FIG. 1A, spreadsheet application 1704 does not visibly display a number of menu options and icons across the top of the display screen. Thus, the interface for spreadsheet application 1704 appears much less cluttered and enables a user to view more cells at one time (for the same resolution and window size) than a conventional spreadsheet application. However, to still provide the functionality and usefullness of the conventional spreadsheet application of FIG. 1A, the menus and icons are not removed, but are merely concealed. A flap 1706 is displayed in an upper right corner of spreadsheet application 1704. Flap 1706 represents an access position that the user can selectively engage with a cursor 1708.

As shown by screen 1700b of FIG. 17B, the user accesses the secondary interface area 1710 by selecting flap 1706 representing the access position with cursor 1708 and then dragging the flap 1706 downwardly. Secondary interface area 1710 includes familiar menus and commands 1712, and icons 1714 to facilitate the normal functionality of spreadsheet application 1704. In one embodiment, secondary interface area 1710 remains present until user again selects flap 1706 with cursor 1710 and/or drags flap 1706 back to its original position. Alternatively, after the user selects one item in the secondary interface area for carrying out a function, the secondary interface area can automatically close.

Steps for Accessing Functions Presented by a Secondary Interface Area

FIG. 18 shows a generalized flow diagram 1800 illustrating logical steps for by which a user accesses functions presented by a secondary interface area. In the example of FIG. 18, the interface is described as a "peel-back" interface, but it will be appreciated that the logical steps of flow diagram 1800 are for other embodiments of the user interface providing access to additional functions on a secondary interface area and do not require use of an interactive display surface.

Flow diagram 1800 begins at a start step 1802. At a decision step 1804, it is determined if a potential peel-back user interface input has been detected. If not, flow diagram 1800 loops back to decision step 1804 until such a user input is detected. Once it is determined at decision step 1804 that such a user input has been detected, at a decision step 1806, it is determined if the input has been made in a designated user interface area. As described above, such an interface may be designated by a flap presented on the display, may be limited to corners or edges of the screen, or a user may be able to initiate access to the secondary interface area anywhere on the screen by performing a predetermined gesture or using a particular physical object recognized by the system. If it is determined at decision step 1806 that such an input has been made in a designated user input area, at a step 1808, an animation or visual effect associated with accessing the secondary interface area at the designated area is performed. For example, a predetermined input may cause a flap to be peeled down, a primary display area to be split open, crumpled, or slid across the screen, as described above. Alternatively, if it was determined at decision step 1806 that no input in a designated user interface area was detected, at a decision step 1810, it is determined if an input has been received by detecting an encoded object used for a peel back user interface. In other words, even if an application may detect and respond to a physical object only in designated portions of the interface, an input may be made using specially shaped or encoded object anywhere on the display surface, as chosen by the user. If it is determined at decision step 1810 that such a specially encoded object has been detected, at a step 1812, an animation associated with detection of the encoded object is performed. On the other hand, if at decision step 1806 it was determined that no input was detected in a designated user interface area, and that in decision step 1810, it was determined that no specially encoded physical object was presented, flow diagram 1800 loops to decision step 1804 to await detection of the next potential user interface input.

If the user input was detected in an appropriate user input area, or such an input made with a specially encoded physical object was detected in decision step 1810, at a step 1814, a secondary interface area is presented to enable access to previously concealed functions. At a decision step 1816, it is determined if one of the functions has been properly selected. If not, according to one embodiment of the present invention, the secondary interface area is concealed once more, and flow diagram 1800 loops to decision step 1804 to await the next related user input. On the other hand, if it is determined at decision step 1816 that the function was properly selected, at a step 1818, the operation associated with the function is performed.

Once the selected function is performed at step 1818, at a decision step 1820, it is determined if the selected function served to end the program. If so, the program, as well as flow diagram 1800, ends at a step 1822. On the other hand, if it is determined at decision step 1820 that the selected function does not end the program, flow diagram 1800 loops to decision step 1804 to await the next related user input.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for receiving input in a computing device having a graphical user interface to access functions related to a displayed window but which are obscured and on an underlying image, the method comprising the steps of:
   (a) identifying at least one additional function of an application window displayed on the graphical user interface of the computing device, the at least one additional function being accessible on at least a portion of an underlying image that is not currently visible to a user, wherein the at least one additional function is inaccessible from a current image of the application window and relates directly to manipulation of the current image;
   (b) presenting the current image to the user, the current image representing a current function of the application and covering at least a portion of the underlying image such that access to the at least one additional function is at least partially covered by the current image rendering the at least one additional function inaccessible from the current image;
   (c) establishing a predetermined user input for providing access to the underlying image and the function accessible thereon; and
   (d) upon receiving the predetermined user input from the user, initiating a visual effect depicting the current image representing the current function of the application being at least partially removed from over the underlying image to visually expose and enable access by the user to the at least one additional function of the application, which was previously visually hidden by the current image,
   wherein steps (a)-(d) are performed on an interactive display table configured to recognize different objects and perform different visual effects to the current image based on which of the different objects is used to perform the predetermined user input, as well as to perform different visual effects for different predetermined user inputs;
   wherein the current image does not include immediately visible functions for at least two of:
   (A) minimizing the current image;
   (B) maximizing the current image; and
   (C) closing the current image; and
   wherein initiating a visual effect depicting the current image representing the current function of the application being at least partially removed from over the underlying image to visually expose and enable access by the user to the at least one additional function of the application includes crumpling at least a portion of the current image and thereby exposing the at least two functions not immediately visible on the current image.

2. The method of claim 1, wherein the underlying image includes at least one of:
   (a) an exit function for the current function represented by the current image; or
   (b) at least one additional menu associated with the application displayed on the current image including a plurality of additional functions not accessible via the current image.

3. The method of claim 1, wherein the display includes an input responsive display and the predetermined input includes positioning an external object adjacent to the input responsive display to interact with the current image, wherein adjacent includes objects that are near, but not actually touching the input responsive display.

4. The method of claim 3, further comprising the step of at least one of:
   (a) responding to the user positioning the external object adjacent to a predetermined area of the current image on the input responsive display;
   (b) responding to the user positioning the external object adjacent to the predetermined area of the input responsive display and lifting the external object away from the input responsive display;
   (c) responding to the user positioning the external object adjacent to a predetermined portion of the input responsive display;
   (d) responding to the user positioning the external object adjacent to a designated portion of the current image on the input responsive display and lifting the external object away from the input responsive display; or
   (e) responding to the user performing a predetermined gesture with the external object adjacent to the input responsive display, including one of:
      (i) placing the external object adjacent to a corner of a predetermined area of the input responsive display, and moving the external object away from the corner of the predetermined area;
      (ii) placing the external object adjacent to an edge of a predetermined area of the input responsive display, and moving the external object away from the edge of the predetermined area;
      (iii) placing the external object adjacent to a corner of the current image, and moving the external object away from the corner of the current image;
      (iv) placing the external object adjacent to an edge of the current image, and moving the object away from the edge of the current image;
      (v) placing a plurality of external objects adjacent to the input responsive display and moving the plurality of external objects apart from each other;

(vi) placing the external object adjacent to a surface of the input responsive display and moving the external object toward an edge of the input responsive display; or (vii) placing the external object adjacent to a surface of the input responsive display and moving at least a portion of the external object in a direction generally parallel with the surface of the input responsive display.

5. The method of claim 3, wherein the external object includes at least one of:

(a) multiple portions of a user's hand;
(b) a user manipulatable object, wherein the object has a shape that is recognized by the input responsive display; or
(c) a user manipulatable object, wherein the object is coded to be recognized by the input responsive display.

6. The method of claim 5, wherein the external object is configured to be recognized by the input responsive display as being associated with providing access to the underlying image, and access is provided to the underlying image upon the configuration of the external object being recognized by the input responsive display.

7. The method of claim 5, wherein the user manipulatable object is a knife-shaped physical object having a blade portion.

8. The method of claim 1, wherein the predetermined action includes manipulating a pointing device to a position on the display and dragging one of corner and an edge of a displayed window generally inwardly into the displayed window.

9. The method of claim 1, wherein the visual effect depicting the current image being at least partially removed from over the underlying image includes one of:

(a) showing an opening forming in the current image, the opening including one of a hole, a rip, a cut, and a tear;
(b) showing the current image being split into a plurality of pieces; or
(c) showing the current image being crumpled.

10. The method of claim 1, wherein after receiving the predetermined user input permits access to the at least one additional function, further comprising the step of initiating the at least one additional function upon one of the following occurring:

(a) while the predetermined user input is being maintained, responding to the user providing an additional user input to trigger execution of the at least one additional function;
(b) after the predetermined user input has been made, responding to the user making the additional user input to trigger execution of the at least one additional function within a predetermined interval of time interval after the predetermined user input has been made; or
(c) after the predetermined user input has been made, responding to the user making the additional user input before any other user input is made.

11. A memory medium on which are stored machine instructions for carrying out the steps of claim 1.

12. A memory medium storing machine instructions for execution on a computing device having a graphical user interface presented on a display configured to be responsive to an input made by one of placing and moving external objects relative to a surface of the display, wherein relative to the surface of the display includes objects that are near, but not actually touching the surface of the display, said machine instructions when executed by the computer device, carrying out a plurality of functions, including:

(a) associating at least one additional function of an application of the computing device with at least a portion of an underlying image, the at least one additional function visually hidden and inaccessible from a current image associated with the application, and the at least one additional function being directly related to manipulation of the current image visually hiding the at least one additional function;
(b) presenting the current image to a user, the current image covering at least a portion of the underlying image such that access to the at least one additional function is at least partially covered by the current image rendering the at least one additional function inaccessible from the current image;
(c) detecting a type of external object adjacent to the surface of the display;
(d) detecting a predetermined user input made for accessing the additional function on the underlying image, the predetermined user input including at least one of:
  (i) the user placing the external object adjacent to a surface of the display, wherein adjacent includes objects that are near, but not actually touching the input responsive display; or
  ii) the user performing a gesture with the external object adjacent to the surface of the display, wherein adjacent includes objects that are near, but not actually touching the input responsive display;
(e) upon detecting the external object and the predetermined user input, initiating a visual effect depicting the current image being at least partially removed from the underlying image, revealing the at least one additional function and enabling access of the at least one additional function by the user to manipulate the current image for which the visual effect has been initiated, wherein initiating the visual effect comprises selecting a visual effect from a plurality of different available visual effects, wherein the selected visual effect is dependent on the type of the external object and either location of placement of the external object or the gesture made with the external object, such that different combinations of external object types, placements and gestures produce different visual effects; and
(f) initiating the at least one additional function and manipulating the current image upon detecting one of:
  (i) while the predetermined user input is being maintained, the user making an additional user input to trigger the at least one additional function;
  (ii) after predetermined the user input has been made, the user making the additional user input to trigger the at least one additional function within a predetermined interval of time after the predetermined user input was made; or
  (iii) after the predetermined user input was made, the user making the additional user input before any other user input is made.

13. The memory medium of claim 12, wherein the underlying image includes at least one of:

(a) an exit function for a current function represented by the current image;
(b) at least one additional menu including a plurality of additional functions not accessible via the current image;
(c) an additional application; or
(d) a control for accessing an operating system function.

14. The memory medium of claim 12, wherein the plurality of functions further include at least one of:

(a) responding to the user positioning the external object adjacent to a predetermined area of the display;
(b) responding to the user positioning the external object adjacent to the predetermined area of the display and lifting the external object away from the display;
(c) responding to the user positioning the external object adjacent to a designated portion of the current image;
(d) responding to the user positioning the external object adjacent to the display in the designated portion of the current image and lifting the external object away from the display; or
(e) responding to the user performing a predetermined gesture with the external object adjacent to the display, including one of:
  (i) placing the external object adjacent to a corner of the predetermined area of the display, and moving the external object away from the corner of the predetermined area;
  (ii) placing the external object adjacent to an edge of the predetermined area of the display, and moving the external object away from the edge of the predetermined area;
  (iii) placing the external object adjacent to a corner of the current image, and moving the external object away from the corner of the current image;
  (iv) placing the external object adjacent to an edge of the current image, and moving the external object away from the edge of the current image;
  (v) placing a plurality of external objects adjacent to the display and moving each of the plurality of external objects apart from each other;
  (vi) placing the external object adjacent to a surface of the display and moving the external object toward an edge of the display; or
  (vii) placing the external object adjacent to the surface of the display and moving at least a portion of the external object in a direction generally parallel with the surface of the display.

15. The memory medium of claim 12, wherein the external object includes at least one of:
(a) a user's hand; or
(b) a shape of the external object that is recognized by the computing device using the display.

16. The memory medium of claim 15, wherein the external object is configured to be recognized by the computing device as being associated with providing access to the underlying image, and access is provided to the underlying image upon the shape of the external object being recognized by the computing device.

17. The memory medium of claim 12, wherein the visual effect depicting the current image being at least partially removed from over the underlying image includes one of:
(a) showing a corner of the current image being peeled back;
(b) showing an edge of the current image being peeled back;
(c) showing an opening forming in the current image, the opening including one of a hole, rip, cut, or tear;
(d) showing the current image being split into pieces;
(e) showing the current image being crumpled; or
(f) showing the current image sliding within the display to at least partially visually reveal the at least the portion of the underlying image.

18. The memory medium of claim 12, wherein after receiving the predetermined user input, the machine instructions cause the computing device to permit access to the at least one additional function, initiating the at least one additional function upon one of:
(a) while the predetermined user input is being maintained, responding to the user making an additional user input to trigger execution of the at least one additional function;
(b) after the predetermined user input has been made, responding to the user making the additional user input to trigger execution of the at least one additional function within a predetermined interval of time interval after the predetermined user input has been made; or
(c) after the predetermined user input has been made, responding to the user making the additional user input before any other user input is made.

19. A system for providing an input to an application that is being executed, comprising:
(a) an interactive display surface adjacent to which a plurality of non-electronic physical objects are manipulated, said interactive display surface presenting visual entities;
(b) a light sensor that optically detects a location of the non-electronic physical objects that are adjacent to the interactive display surface, wherein adjacent includes non-electronic physical objects that are near, but not actually touching the input responsive display, and wherein said light sensor detects the location of the physical objects near, but not actually touching the input responsive display;
(c) a processor in communication with the light sensor and the display device; and
(d) a memory in communication with the processor, the memory storing data and machine instructions that cause the processor to carry out a plurality of functions, including:
  (i) associating at least one additional function of an application of the computing device with at least a portion of an underlying image that is initially at least partially hidden by a current image associated with the application, which at least one additional function is directly related to manipulation of the current image;
  (ii) presenting the current image to a user, the current image being associated with a current function and covering at least a portion of the underlying image so that the at least one additional function is at least partially covered and obscured by the current image rendering the at least one additional function inaccessible from the current image;
  (iii) detecting a type of external object adjacent to the surface of the display as well as a predetermined user input for providing access to the underlying image, wherein the detected predetermined user input includes at least one of:
    (1) the user placing the external object adjacent to the interactive display surface, wherein adjacent includes objects that are near, but not actually touching input responsive display; or
    (2) the user performing a gesture with the external object adjacent to the interactive display surface, wherein adjacent includes objects that are near, but not actually touching the input responsive display; and
  (iv) upon detecting the type of external object and the predetermined user input, initiating a visual effect depicting the current image being at least partially removed from over the underlying image to thereby visually expose and enable access by a user to the at least one additional function, which was previously at least partially hidden by the current image and which allows manipulation of the current image previously partially removed from over the at least one additional function, wherein initiating the visual effect comprises selecting a visual effect from a plurality of different available visual effects, wherein the selected visual effect is dependent on the type of the external object and the predetermined user input, such that different combinations of external object types and predetermined user inputs produces different visual effects.

20. The system of claim 19, further comprising at least one non-electronic external object, and wherein the predetermined user input includes at least one of:

(a) positioning the at least one non-electronic external object adjacent to a predetermined area of the display, wherein adjacent includes objects that are near, but not actually touching the input responsive display;

(b) positioning the at least one external object adjacent to the predetermined area of the display and lifting at least one external object away from the display, wherein adjacent includes objects that are near, but not actually touching the input responsive display;

(c) positioning the at least one external object adjacent to a designated portion of the current image, wherein adjacent includes objects that are near, but not actually touching the input responsive display;

(d) positioning the at least one external object adjacent to the designated portion of the current image and lifting at least one external object away from the display, wherein adjacent includes objects that are near, but not actually touching the input responsive display; or (e) performing a predetermined gesture with the external object adjacent to the display, including one of:

(i) placing the at least one external object adjacent to a corner of the predetermined area of the display, and moving at least one external object away from the corner of the predetermined area;

(ii) placing the at least one external object adjacent to an edge of the predetermined area of the display, and moving at least one external object away from the edge of the predetermined area;

(iii) placing the at least one external object adjacent to a corner of the current image, and moving at least one external object away from the corner of the current image;

(iv) placing the at least one external object adjacent to an edge of the current image, and moving at least one external object away from the edge of the current image;

(v) placing a plurality of external objects adjacent to the display and moving at least some of the plurality of external objects apart from each other;

(vi) placing the at least one external object adjacent to a surface of the display and moving at least one external object toward an edge of the display; or (vii) placing the external object adjacent to the surface of the display and moving at least a portion of at least one external object in a direction generally parallel with the surface of the display.

21. The system of claim 19, wherein the visual effect depicting the current image being at least partially removed from over the underlying image includes one of:

(a) showing the current image being split into a plurality of pieces; or (b) showing the current image being crumpled.

* * * * *